United States Patent
Kim et al.

(10) Patent No.: US 10,496,901 B2
(45) Date of Patent: Dec. 3, 2019

(54) IMAGE RECOGNITION METHOD

(71) Applicant: Panasonic Intellectual Property Corporation of America, Torrance, CA (US)

(72) Inventors: Min Young Kim, San Jose, CA (US); Luca Rigazio, Gatos, CA (US); Ryota Fujimura, Kanagawa (JP); Sotaro Tsukizawa, Osaka (JP); Kazuki Kozuka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/262,813

(22) Filed: Sep. 12, 2016

(65) Prior Publication Data

US 2017/0083796 A1  Mar. 23, 2017

Related U.S. Application Data

(60) Provisional application No. 62/220,535, filed on Sep. 18, 2015.

(30) Foreign Application Priority Data

May 16, 2016 (JP) ................. 2016-098222

(51) Int. Cl.
*G06K 9/62* (2006.01)

(52) U.S. Cl.
CPC .................. *G06K 9/6273* (2013.01)

(58) Field of Classification Search
CPC ............... G06K 9/6273; G06K 9/6267; G06K 9/00369; G06K 9/00805; G06K 9/4628; G06K 9/4671; G06T 2207/20084; G06T 7/70

See application file for complete search history.

(56) References Cited

U.S. PATENT DOCUMENTS

2015/0347820 A1* 12/2015 Yin ................... G06K 9/00221
382/118

OTHER PUBLICATIONS

Szarvas, Mate, et al. "Pedestrian detection with convolutional neural networks." Intelligent vehicles symposium, 2005. Proceedings. IEEE. IEEE, 2005. 9 pages.*

(Continued)

*Primary Examiner* — Manav Seth
(74) *Attorney, Agent, or Firm* — Greenblum & Bernstein, P.L.C.

(57) ABSTRACT

In an image recognition method executed by a computer of an image recognizer using a convolutional neural network, the convolutional neural network is a first convolutional neural network in which a fully connected layer is changed to a convolutional layer, and the method includes controlling a first convolutional neural network to acquire an input image, controlling the first convolutional neural network to estimate a center area of a recognition target in the acquired input image and to output a value indicating the estimated center area as a location of the recognition target in the input image.

5 Claims, 24 Drawing Sheets

(56) References Cited

OTHER PUBLICATIONS

Jerry, Chi Ling Lam, and Moshe Eizenman. "Convolutional neural networks for eye detection in remote gaze estimation systems." Proceedings of the International MultiConference of Engineers and Computer Scientists. vol. 1. Citeseer, 2008. 6 pages (Year: 2008).*

The Extended European Search Report dated Feb. 7, 2017 for the related European Patent Application No. 16188731.0.

Kai Kang et al: "Fully Convolutional Neural Networks for Crowd Segmentation", Nov. 17, 2014 Nov. 17, 2014, XP055340679, Retrieved from the Internet: URL:https://arxiv.org/pdf/1411.4464v1.pdf [retrieved on Jan. 31, 2017].

Jonathan Long et al., "Fully Convolutional Networks for Semantic Segmentation", The IEEE Conference on Computer Vision and Pattern Recognition (CVPR), Jul. 8, 2015, pp. 3431-3440.

\* cited by examiner

LIMITED INPUT-SIZE

INPUT IMAGE    801    902

KERNEL SLIDING
INPUT SIZE NOT LIMITED set07_V010_100269(Results)

set07_V010_100269(GT)

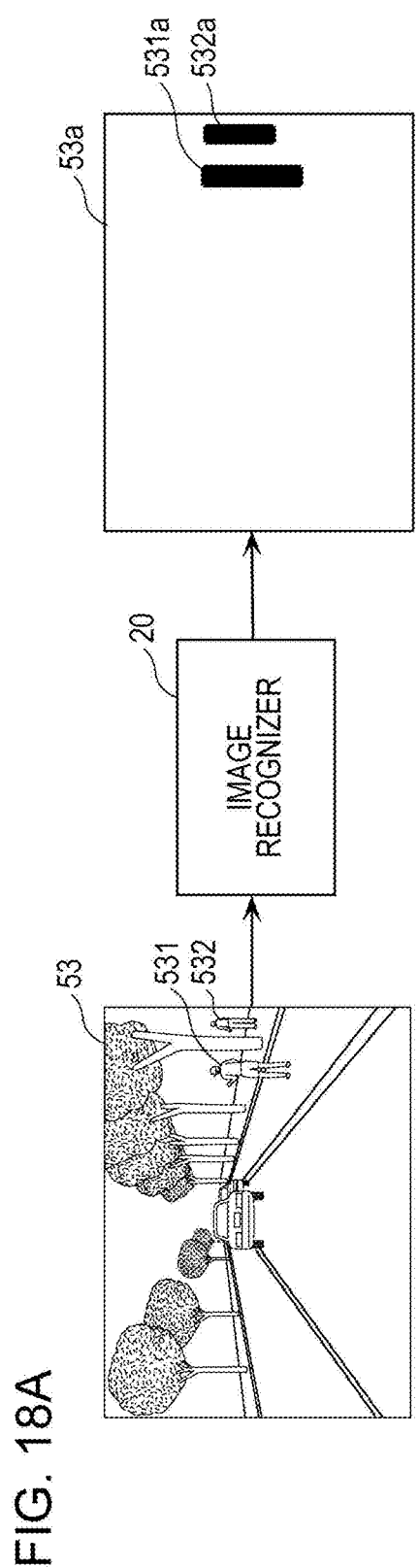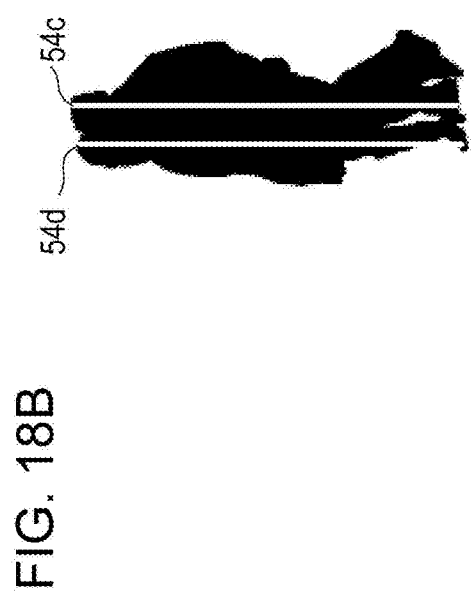
FIG. 18A
FIG. 18B

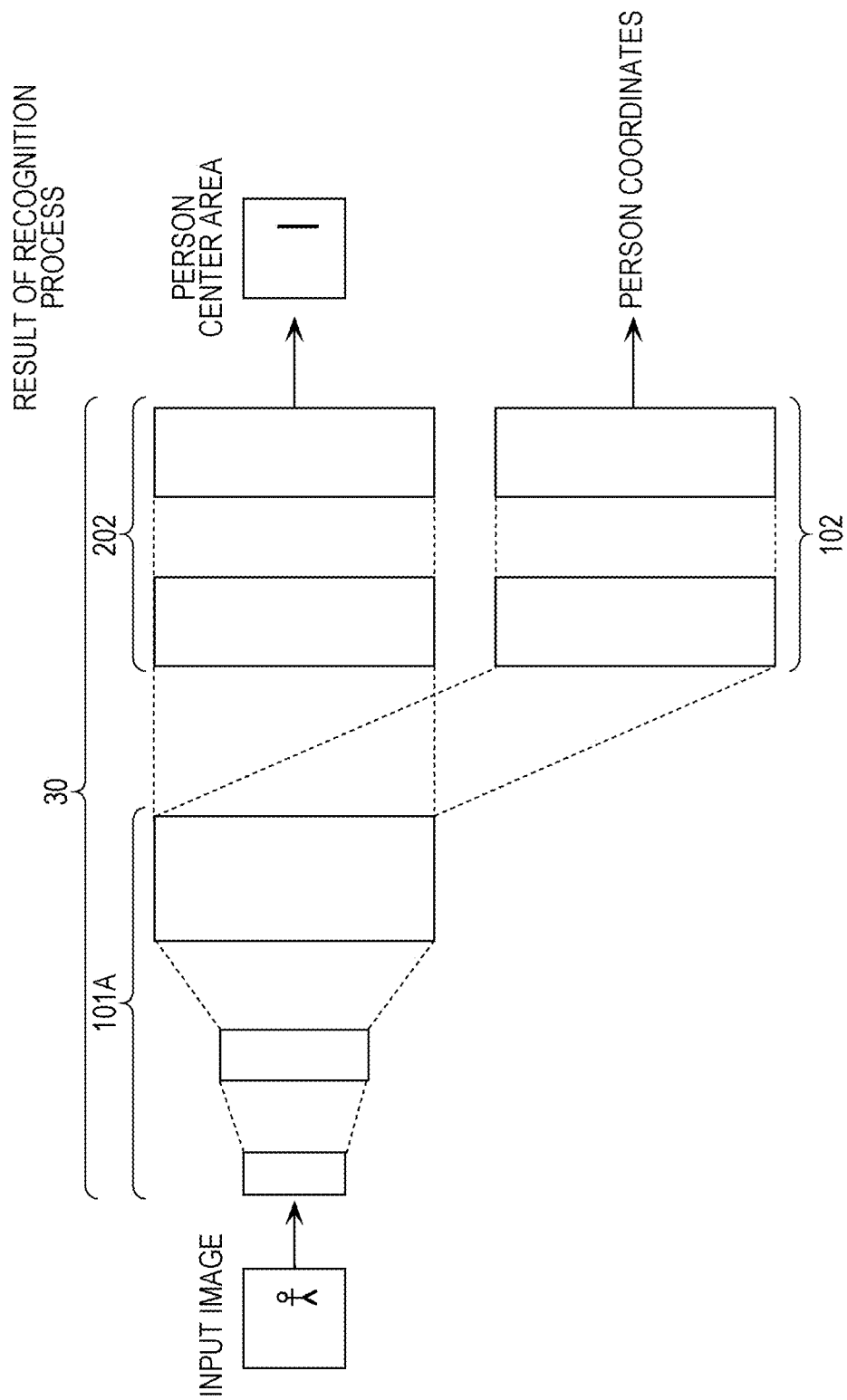

IMAGE RECOGNITION METHOD

BACKGROUND

1. Technical Field

The present disclosure relates to an image recognition method, and more particularly, to an image recognition method executed by a computer of an image recognizer using a convolutional neural network.

2. Description of the Related Art

In recent years, a drastic advance has been achieved in image recognition performance by use of deep learning. The deep learning is known as a method of machine learning using a multilayer neural network. In many cases, a convolutional neural network is employed as the multilayer neural network. The convolutional neural network includes a multilayer neural network that repeatedly performs convolution on a local area and pooling.

However, the image recognition process using such a convolutional neural network has a problem that the process cannot be performed on a real-time basis.

It has been proposed to configure a convolutional neural network such that a fully connected layer in the convolutional neural network is replaced with a convolutional layer (see, for example, Jonathan Long, Evan Shelhamer, and Trevor Darrell, "Fully Convolutional Networks for Semantic Segmentation"; The IEEE Conference on Computer Vision and Pattern Recognition (CVPR), 2015, pp. 3431-3440). By using the convolutional neural network (fully convolutional neural network) configured in this manner, it is possible to perform an image recognition process on a real-time basis.

SUMMARY

In one general aspect, the techniques disclosed here feature an image recognition method executed by a computer of an image recognizer using a convolutional neural network, the convolutional neural network being a first convolutional neural network in which a fully connected layer is changed to a convolutional layer, the method including controlling the first convolutional neural network to acquire an input image, and controlling the first convolutional neural network to estimate a center area of a recognition target in the acquired input image and to output a value indicating the estimated center area as a location of the recognition target in the input image.

According to the present disclosure, it is possible to realize an image recognition method capable of recognize each of a plurality of recognition targets partially overlapping in an image.

It should be noted that general or specific embodiments may be implemented as a system, a method, an integrated circuit, a computer program, a computer-readable storage medium such as a CD-ROM disk, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 18A is a diagram illustrating an example of a result of a recognition process performed by the image recognizer according to the second embodiment;

FIG. 18B is a diagram conceptually illustrating a feature of the recognition process performed by the image recognizer according to the second embodiment;

FIG. 24 is a diagram illustrating an outline of a structure of a convolutional neural network used by an image recognizer according to a third embodiment and also illustrating a result of a recognition process;

DETAILED DESCRIPTION

Figure 1:
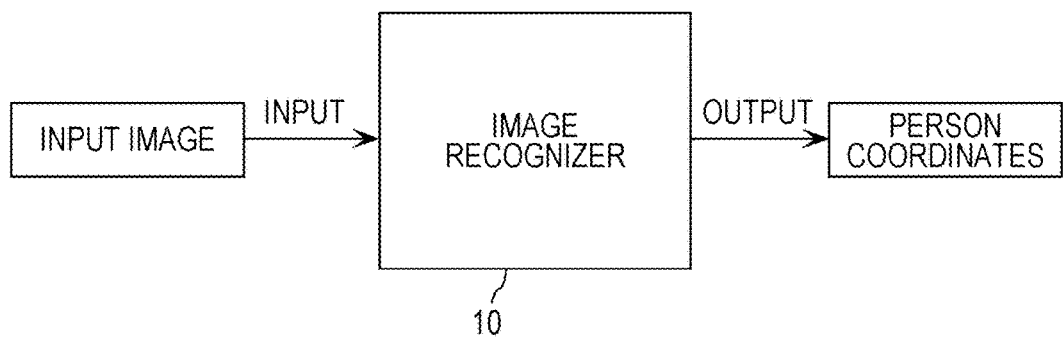
FIG. 1 is a block diagram illustrating an example of a configuration of an image recognizer according to a first embodiment.

Underlying Knowledge Forming Basis of the Present Disclosure

An advanced driver assistance system (ADAS) has been under consideration to provide a system to detect in advance a potential accident or the like and avoid it.

A drastic advance has been achieved in performance of image recognition using a convolutional neural network as described above, and thus it is expected that it will be used in the ADAS to detect a pedestrian.

The convolutional neural network includes a convolutional layer that extracts a feature by performing a convolution process using a plurality of filters, a pooling layer that ensures local invariance of data by performing a pooling process so as to collect reactions in a particular area, and a fully connected layer that performs recognition based on a probability using a softmax function or the like.

However, the image recognition process using the convolutional neural network such as that described above has a problem that it is impossible to perform it on a real-time basis. In a case where the image recognition process using the convolutional neural network is used in the ADAS to detect a pedestrian, a processing speed as fast as about 10 FPS (Frame Per Second) is required. However, the processing speed achieved in the image recognition process using the convolutional neural network is much smaller than the required processing speed.

On the other hand, as described above, it is possible to perform in real time the image recognition process using the fully convolutional neural network disclosed in Jonathan Long, Evan Shelhamer, and Trevor Darrell, "Fully Convolutional Networks for Semantic Segmentation"; The IEEE Conference on Computer Vision and Pattern Recognition (CVPR), 2015, pp. 3431-3440.

However, even when the image recognition is performed using this method, there is a possibility that it is impossible to properly perform the image recognition of a plurality of recognition targets such as a plurality of persons in a particular case such as that in which two or more recognition targets are partially overlap in an image. That is, in the image recognition using the fully convolutional neural network, when a plurality of pedestrians partially overlap in an image, it is impossible to recognize that there are different pedestrians, and thus it is not allowed to simply apply this technique to the ADAS.

In view of the above, inventors of the present invention have got an idea of an image recognition method capable of correctly recognizing each recognition target in a plurality of recognition targets partially overlapping in an image.

That is, in an aspect, present disclosure provides an image recognition method executed by a computer of an image recognizer using a convolutional neural network, the convolutional neural network being a first convolutional neural network in which a fully connected layer is changed to a convolutional layer, the method including controlling the first convolutional neural network to acquire an input image, and controlling the first convolutional neural network to estimate a center area of a recognition target in the acquired input image and to output a value indicating the estimated center area as a location of the recognition target in the input image.

This enables correct recognition of each of a plurality of recognition targets partially overlapping in an image.

The image recognition method may further include, before performing the acquisition of the input image by the first convolutional neural network, controlling the first convolutional neural network to learn a weight of the first convolutional neural network by using learning data including a plurality of sets of a training image and a correct answer image, the training image including a recognition target, the correct answer image including the training image and a value indicating a center area of the recognition target.

For example, the learning may include controlling a second convolutional neural network to output a value indicating a location of the recognition target in the training image included in the learning data, the second convolutional neural network having the same structure as that of the first convolutional neural network except that a fully connected layer in the convolutional neural network is replaced with a convolutional layer, calculating an error, according to an error function, between the value indicating the center area of the recognition target indicated by the correct answer image corresponding to the training image included in the learning data and the value indicating the recognition target output in the learning, updating the weight of the second convolutional neural network based on the calculated error, recursively performing the calculation by controlling the second convolutional neural network with the updated weight to again perform the outputting in the learning, and in a case where the calculated error achieves a minim value in the recursive calculation, ending the recursive calculation and determining the weight of the second convolutional neural network assigned when the error achieves the minimum value as the weight of the first convolutional neural network.

The error function may be, for example, an error function using cross entropy.

The center area may be a center area extending in a vertical direction of center areas one of which extends in the vertical direction and the other one of which extends in a horizontal direction.

In an aspect, the present disclosure provides an image recognition method executed by a computer of an image recognizer using a convolutional neural network, the convolutional neural network being a first convolutional neural network in which a fully connected layer is changed to a convolutional layer, the method including controlling the first convolutional neural network to acquire an input image, controlling the first convolutional neural network to estimate coordinates of two vertices on a diagonal of a rectangle surrounding a recognition target in the acquired input image and to output the estimated coordinates of the two vertices as a location of the recognition target in the input image.

The image recognition method may further include, before performing the acquisition of the input image by the first convolutional neural network, controlling the first convolutional neural network to learn a weight of the first convolutional neural network by using learning data including a plurality of sets of a training image and a correct answer image, the training image including a recognition target, the correct answer image including the training image and coordinates of two vertices on a diagonal of a rectangle surrounding the recognition target.

For example, the learning may include controlling a second convolutional neural network to output a value indicating a location of the recognition target in the training image included in the learning data, the second convolutional neural network having the same structure as that of the first convolutional neural network except that a fully connected layer in the convolutional neural network is replaced with a convolutional layer, calculating an error, according to an error function, between the output value indicating the location of the recognition target and coordinates of two vertices on a diagonal of a rectangle surrounding the recognition target indicated by the correct answer image corresponding to the training image included in the learning data, updating the weight of the second convolutional neural network based on the calculated error, recursively performing the calculation by controlling the second convolutional neural network with the updated weight to again perform the outputting in the learning, and, in a case where the calculated error achieves a minim value in the recursive calculation, ending the recursive calculation and determining the weight of the second convolutional neural network assigned when the error achieves the minimum value as the weight of the first convolutional neural network.

Herein, for example, the error function may be an error function using a Euclidean distance.

For example, the recognition target may be a person in the input image.

Note that each embodiment described below is for illustrating a specific example of the present disclosure. That is, in the following embodiments of the present disclosure, values, shapes, constituent elements, steps, the order of steps, and the like are described by way of example but not limitation. Among constituent elements described in the following embodiments, those constituent elements that are not described in independent claims indicating highest-level concepts of the present disclosure are optional. The details of the above-described embodiments may be combined.

First Embodiment

An image recognition method and the like executed by an image recognizer 10 according to a first embodiment are described below referring to drawings.

Configuration of Image Recognizer 10

Figure 2:
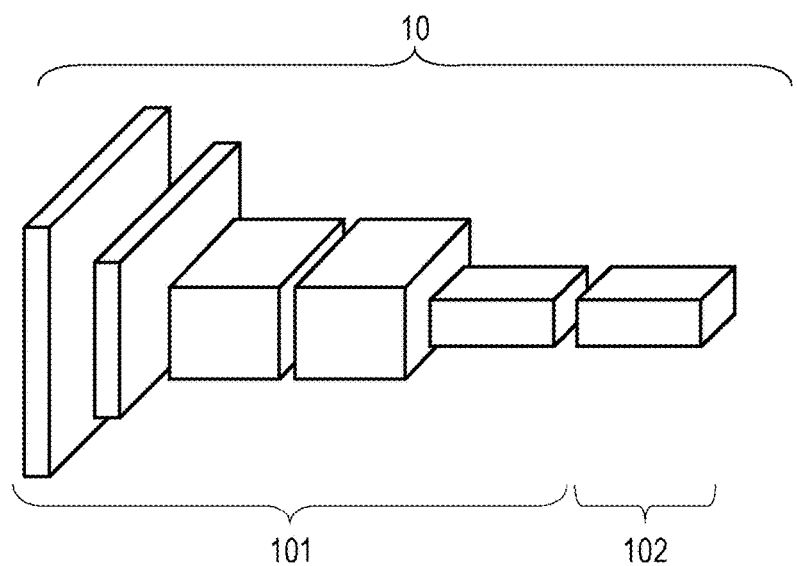
FIG. 2 is a diagram illustrating an outline of a structure of a neural network used by the image recognizer shown in FIG. 1.

FIG. 1 is a block diagram illustrating an example of a configuration of the image recognizer 10 according to the present embodiment. FIG. 2 is a diagram illustrating an outline of a structure of the neural network used by the image recognizer 10 shown in FIG. 1.

The image recognizer 10 shown in FIG. 1 may be realized by a computer or the like. When the image recognizer 10 receives an input image, the image recognizer 10 recognizes a person given as a recognition target in the input image by using the convolutional neural network such as that shown in FIG. 2, and outputs coordinate values (person coordinates) as values indicating a location, in the input image, of the recognized person. In the present embodiment, it is assumed by way of example that the recognition target is a person. However, the recognition target is not limited to a person, but the recognition target may be a traffic sign or the like. Furthermore, in the present embodiment, it is assumed by way of example that the person is a pedestrian. However, the person is not limited to a pedestrian, but the person may be a running person, a creeping person, a swimming person, or the like.

As shown in FIG. 2, the convolutional neural network used by the image recognizer 10 is a convolutional neural network including a convolutional layer 101 and a convolutional layer 102 employed instead of a fully connected layer. Hereinafter, this convolutional neural network will be referred to as a first convolutional neural network.

Comparative Example

First, a general process associated with a convolutional neural network (CNN) is described below.

Convolutional neural networks are widely used in the field of the image recognition to extract a feature value from a two-dimensional image by performing convolution on the image using a filter. The convolutional neural network includes, as described above, a multilayer network configured to repeated convolution and pooling. In the convolutional neural network, coefficients (weights) of filters of the convolutional layer are learned using a large amount of data such as a large number of training images. These coefficients (weights) are obtained by learning such that convolution using the filters and pooling for collecting reactions in a particular area are performed repeatedly using a large amount of data thereby achieving invariance for various modifications. It is known than the recognition performance of the convolutional neural network depends on the filters of the convolutional layer.

Next, a description is given below as to an outline of a recognition process performed by an image recognizer 80 of the first comparative example using a convolutional neural network including a fully connected layer and that performed by an image recognizer 90 of the second comparative example using a fully convolutional neural network in which the fully connected layer is replaced with a convolutional layer.

Figure 3A:
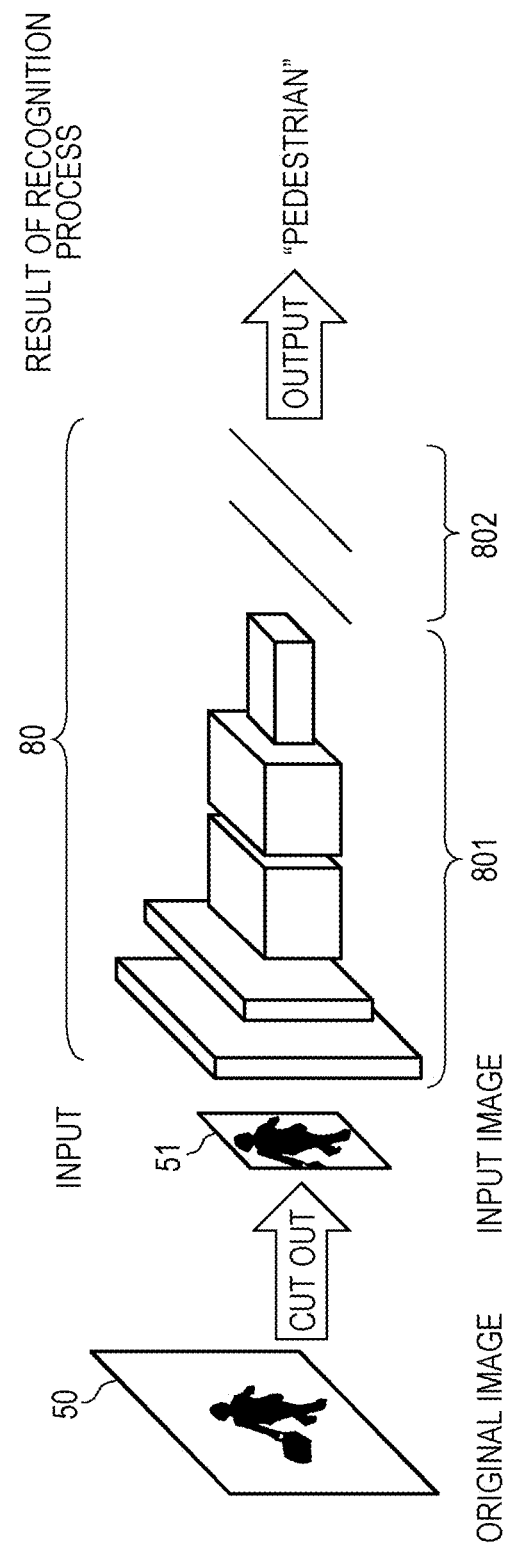
FIG. 3A is a diagram illustrating an outline of a structure of a convolutional neural network used by an image recognizer of a first comparative example and also illustrating a result of a recognition process.
Figure 3B:
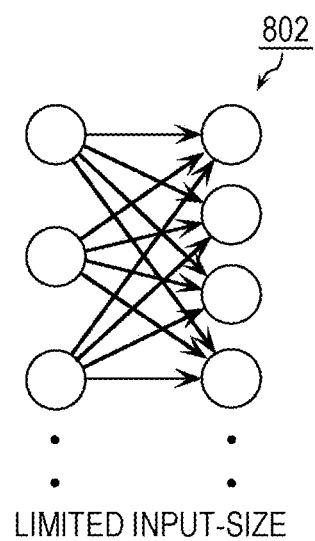
FIG. 3B is a diagram illustrating a concept of a structure of a fully connected layer shown in FIG. 3A.

FIG. 3A is a diagram illustrating an outline of a structure of the convolutional neural network used by the image recognizer 80 of the first comparative example and also illustrating a result of a recognition process. FIG. 3B is a diagram illustrating a concept of a structure of the fully connected layer 802 shown in FIG. 3A.

As shown in FIG. 3A, the convolutional neural network used by the image recognizer 80 of the first comparative example is a convolutional neural network including a convolutional layer 801 and a fully connected layer 802. In the first comparative example, when the image recognizer 80 receives an input image which was extracted from an original image into a particular size, the image recognizer 80 performs a two-dimensional recognition process to determine whether a recognition target such as a person exists in the input image. If a recognition target exists in the input image, the image recognizer 80 outputs information indicating that a person exists in the input image.

In the example shown in FIG. 3A, an image 51 with a fixed size is obtained by extracting an image 50, and the resultant image 51 is input to the image recognizer 80 of the first comparative example. The image recognizer 80 of the first comparative example performs a recognition process to determine whether a recognition target such as a pedestrian exists in the input image 51. In this example, the image 51 includes a pedestrian, i.e., a recognition target, and thus the image recognizer 80 of the first comparative example outputs a recognition result indicating that there is a pedestrian.

The convolutional neural network used by the image recognizer 80 of the first comparative example includes the fully connected layer 802, for example, such as that shown in FIG. 3B. Because the output from the fully connected layer 802 is fixed, the input image processable by this convolutional neural network has a fixed size. That is, the image recognizer 80 of the first comparative example can perform the recognition process only on images with the fixed size. Therefore, in the recognition process by the image recognizer 80 of the first comparative example, in a case where the size of an original image is greater than the maximum allowable image size that can be handled in the recognition process, it is necessary to extract an area of the original image into the allowable image size.

As described above, the image recognizer 80 of the first comparative example extracts a particular area and performs the recognition process on the extracted to determine whether a recognition target such as a pedestrian exists, and thus the image recognizer 80 of the first comparative example cannot perform the recognition process on a real-time basis.

Figure 4A:
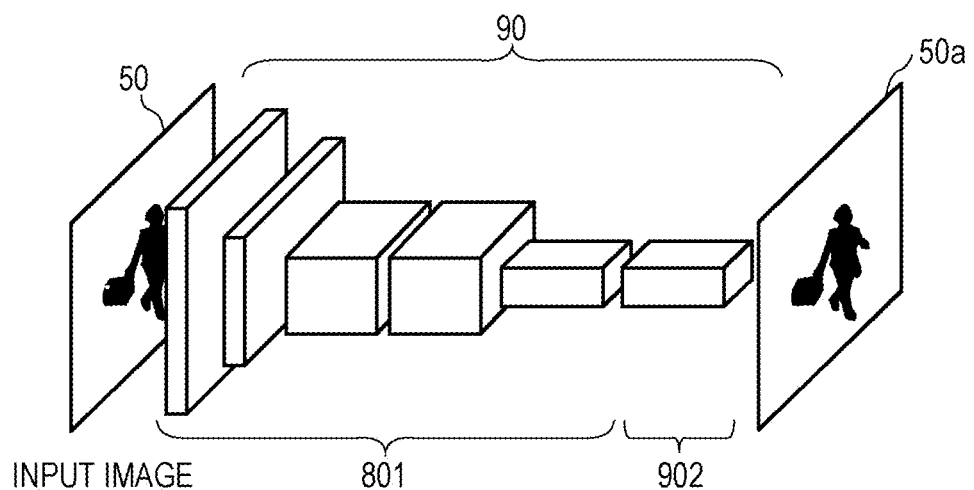
FIG. 4A is a diagram illustrating an outline of a structure of a fully convolutional neural network used by an image recognizer of a second comparative example and also illustrating a result of a recognition process.
Figure 4B:
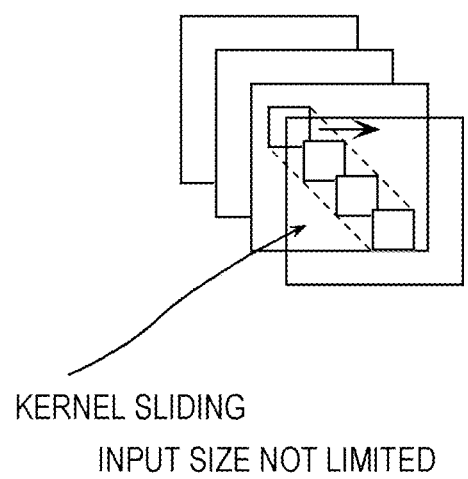
FIG. 4B is a diagram illustrating a concept of a structure of a convolutional layer shown in FIG. 4A.

FIG. 4A is a diagram illustrating an outline of a structure of the fully convolutional neural network used by the image recognizer 90 of the second comparative example and also illustrating a result of a recognition process. In FIG. 4A, similar elements to those in FIG. 3A are denoted by similar reference numerals. FIG. 4B is a diagram illustrating a concept of a structure of a convolutional layer 902 shown in FIG. 4A.

The fully convolutional neural network used by the image recognizer 90 of the second comparative example includes a convolutional layer 902 that performs convolution on a local area while sliding a kernel (filter) within the input image in a manner, for example, as shown in FIG. 4B. Unlike the fully connected layer 802, the output of the convolutional layer 902 is not fixed, and thus the fully convolutional neural network is capable of performing the recognition process on input images with an arbitrary size.

In the example shown in FIG. 4A, when the image 50 is input to the image recognizer 90 of the second comparative example, the image recognizer 90 performs a recognition process on an area of the image 50 where a recognition target such as a pedestrian exists. The image recognizer 90 of the second comparative example outputs, as a recognition result, a feature map indicating an area where the pedestrian exists in an image 50*a*.

Figure 5A:
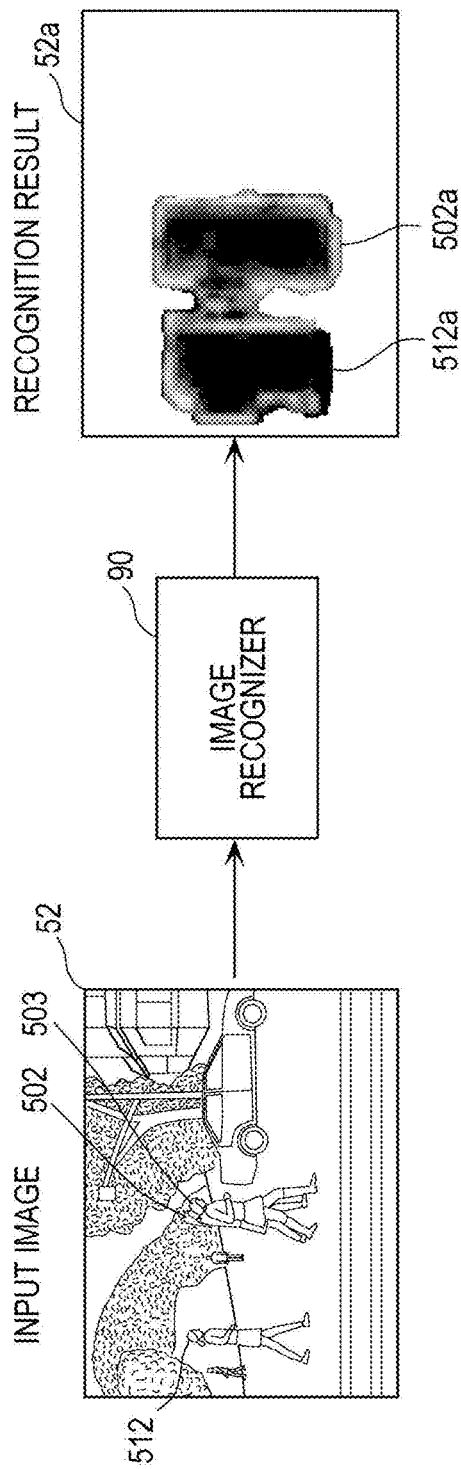
FIG. 5A is a diagram illustrating an example of a result of a recognition process performed by the image recognizer of the second comparative example.
Figure 5B:
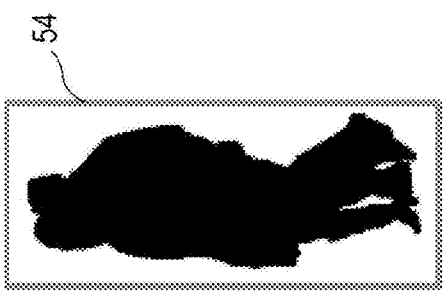
FIG. 5B is a diagram conceptually illustrating a problem with a recognition process performed by the image recognizer of the second comparative example.

FIG. 5A is a diagram illustrating an example of a result of a recognition process performed by the image recognizer 90 of the second comparative example. FIG. 5B is a diagram conceptually illustrating a problem in the recognition process performed by the image recognizer 90 of the second comparative example.

As shown in FIG. 5A, in a case where the image recognizer 90 of the second comparative example performs the recognition process on an image 52 including a plurality of pedestrians, the image recognizer 90 outputs, as a recognition result, a feature map 502*a* and a feature map 512*a* indicating areas where pedestrians exist in the image 52*a*. Note that each feature map is represented in softmax probability associated with "background" and "pedestrian". In FIG. 5A, the background is converted into a white background area.

The image 52 includes three persons (persons 502, 503, and 512) and two of them (persons 502 and 503) partially overlap. However, in the image 52*a*, a result of the recognition process is obtained such the same area indicated by the feature map 502*a* includes two persons (persons 502 and 503). That is, the image recognizer 90 of the second comparative example has the above-described problem that when pedestrians (persons) partially overlap in the input image 54, for example, as shown in FIG. 5B, it is impossible to separate the two pedestrians in the recognition.

Recognition Process by Image Recognizer 10

Next, a recognition process performed by the image recognizer 10 according to the first embodiment is described below with reference to drawings.

Figure 6:
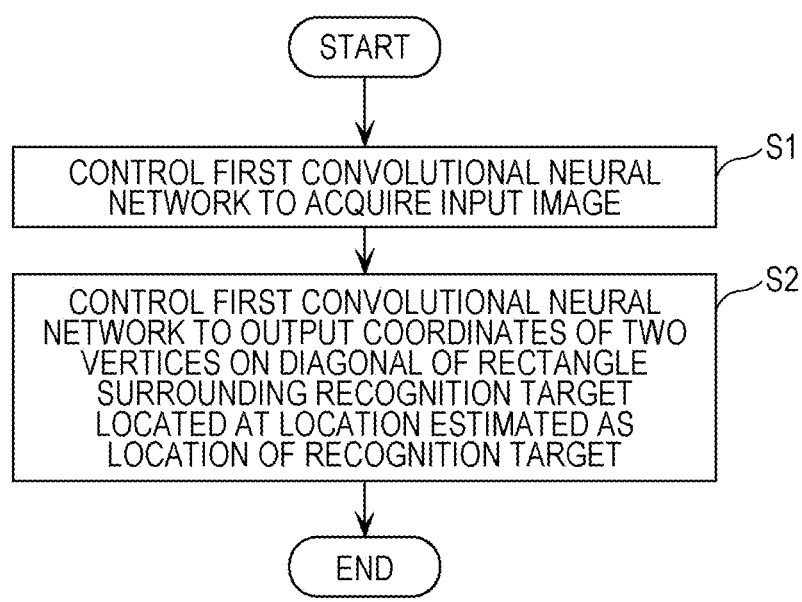
FIG. 6 is a flow chart illustrating an example of an operation of recognition process according to a first embodiment.
Figure 7:
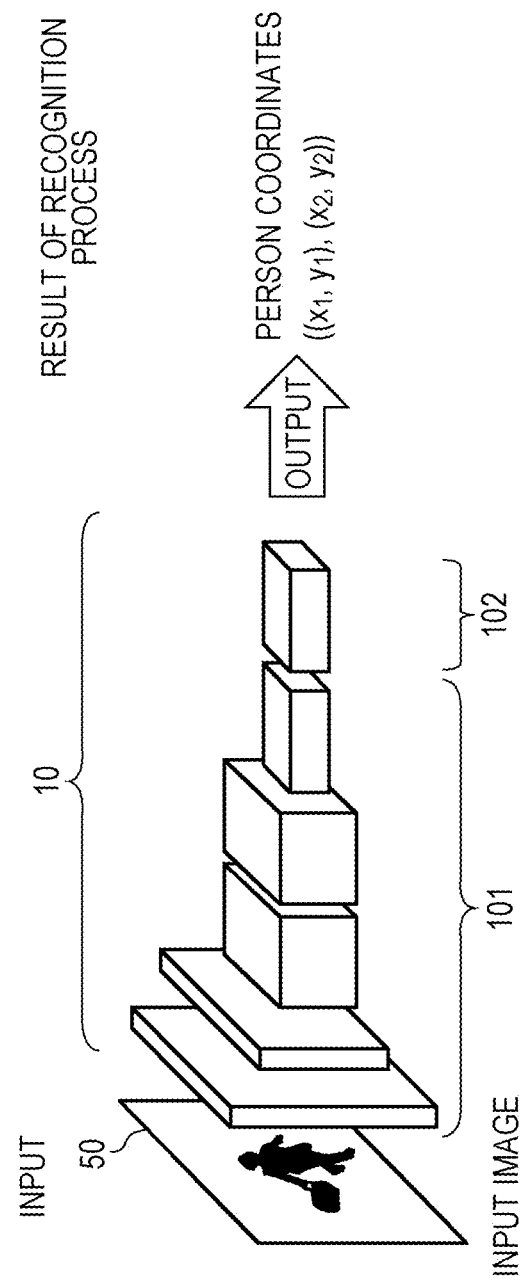
FIG. 7 is a diagram conceptually illustrating a result of a recognition process performed by the image recognizer according to the first embodiment.

FIG. 6 is a flow chart illustrating an example of a recognition process according to the present embodiment. FIG. 7 is a diagram conceptually illustrating a result of a recognition process performed by the image recognizer 10 according to the present embodiment.

As shown in FIG. 6, a computer in the image recognizer 10 first makes the first convolutional neural network acquire an input image (S1). In the example shown in FIG. 7, an image 50 including one person (pedestrian) is input as an input image to the image recognizer 10. The first convolutional neural network used by the image recognizer 10 includes a convolutional layer 102 configured to perform convolution on a local area while sliding a kernel (filter) within the input image, for example, as shown in FIG. 4B. Thus, it is possible to perform the recognition process on an input image with an arbitrary size as with the image recognizer 90 of the second comparative example.

Next, the first convolutional neural network is controlled to estimate coordinates of two vertices on a diagonal of a rectangle surrounding the recognition target in the image 50 acquired in S1 and output the estimated coordinates of the two vertices as the location of the recognition target in the image 50 (S2). In the example shown in FIG. 7, the recognition target such as a pedestrian or the like in the image 50 is subjected to the recognition process and coordinates of the recognition target in the image 50 are output. As the coordinates described above, the image recognizer 10 outputs, as a recognition result, coordinates ((x1, y1), (x2, y2)) of upper-left and lower-right vertices of vertices of a rectangle surrounding the recognition target.

Effects and the Like of Image Recognizer 10

As described above, the image recognizer 10 according to the first embodiment is capable of outputting coordinates, in an image, of a recognition target, and thus is capable of correctly recognizing each of recognition targets that partially overlap. This is explained in further detail below with reference to drawings.

Figure 8A:
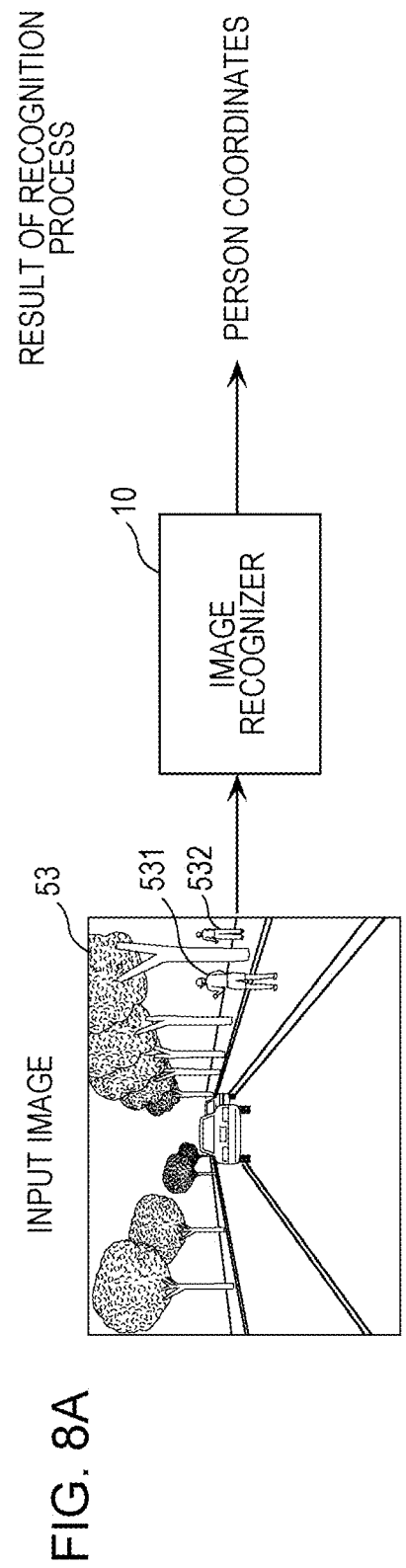
FIG. 8A is a diagram illustrating an example of a result of a recognition process performed by the image recognizer according to the first embodiment.
Figure 8B:
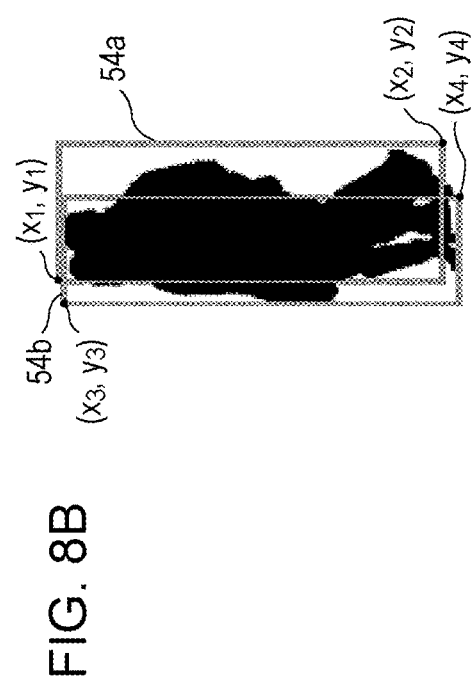
FIG. 8B is a diagram conceptually illustrating a feature of the recognition process performed by the image recognizer according to the first embodiment.

FIG. 8A is a diagram illustrating an example of a result of a recognition process performed by the image recognizer 10 according to the present embodiment. FIG. 8B is a diagram conceptually illustrating a feature of the recognition process performed by the image recognizer 10 according to the present embodiment.

As shown in FIG. 8A, when the image recognizer 10 performs a recognition process on an image 53 including two pedestrians (a person 531 and a person 532), the image recognizer 10 outputs, as a recognition result, coordinates of two vertices on a diagonal of a rectangle surrounding the two pedestrians to indicate locations of the two pedestrians in the image 53. Herein, the coordinates of the two vertices may be coordinates of upper-left and lower-right vertices or upper-right and lower-left vertices of four vertices of a rectangle surrounding a pedestrian in the image 53.

As described above, the image recognizer 10 is capable of outputting, as a recognition result, coordinates of two vertices on a diagonal of a rectangle surrounding a recognition target in the input image. More specifically, in a case where two persons in the input image partially overlap as shown in FIG. 8B, the image recognizer 10 is capable of outputting, as a recognition result, coordinates ((x1, y1), (x2, y2)) of two vertices of a rectangle 54a surrounding one person and coordinates ((x3, y3), (x4, y4)) of two vertices of a rectangle 54b surrounding the other person.

Thus, the image recognizer 10 is capable of correctly recognizing respective recognition targets partially overlapping in the image and capable of outputting coordinates indicating a recognition result.

Training Process of Image Recognizer 10

A training process for realizing the image recognizer 10 is described below. In the following discussion, an image recognizer 10a denotes an image recognizer that is in a state where the training process for making it possible for the image recognizer to function as the image recognizer 10 is not yet performed.

To enable the image recognizer 10a to function as the image recognizer 10, the first convolutional neural network is controlled in advance to perform a training process to learn weights of the first convolutional neural network by using learning data including a plurality of sets of a training image and a correct answer image, the training image including a recognition target the correct answer image including the training image and coordinates of two vertices on a diagonal of a rectangle surrounding the recognition target.

Figure 9:
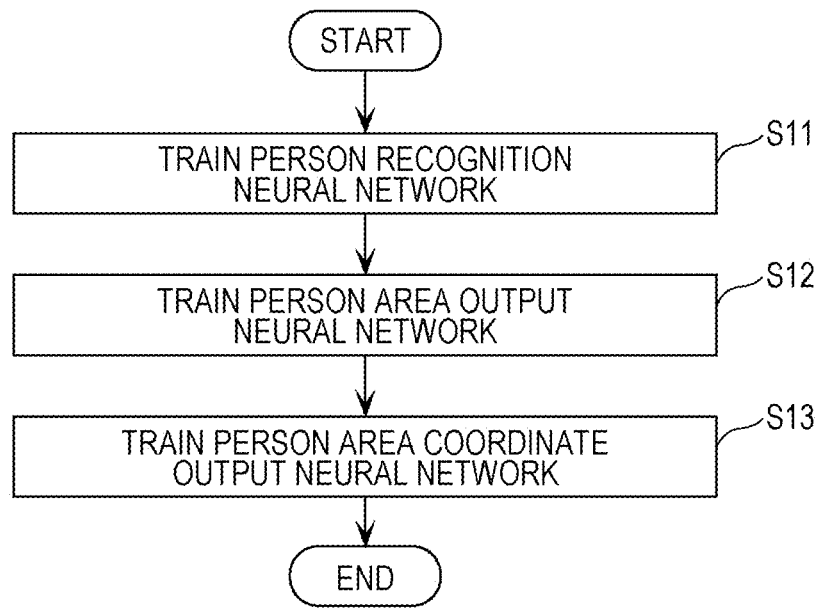
FIG. 9 is a flow chart illustrating an outline of a training process performed by the image recognizer according to the first embodiment.

FIG. 9 is a flow chart illustrating an outline of the training process performed by the image recognizer 10a according to the present embodiment.

First, as shown in FIG. 9, training of a person recognition neural network is performed using the learning data described above (S11). More specifically, the computer of the image recognizer 10a makes a convolutional neural network including a fully connected layer, which is a neural network used by the image recognizer 10a, learn person recognition, that is, learn weights in recognition as to whether there is a person in an input image using the learning data described above. The training process in S11 is known and thus a further detailed description thereof is omitted.

Next, training of a person area output neural network is performed using the learning data described above (S12). More specifically, the computer of the image recognizer 10a controls a second convolutional neural network, which is obtained by removing the fully connected layer from the neural network subjected to the training in S11 and adding, instead, a convolutional layer thereto, to learn, using the learning data described above, outputting a person area, that is, learn outputting an area (person area) where a person exists in the input image.

Figure 10:
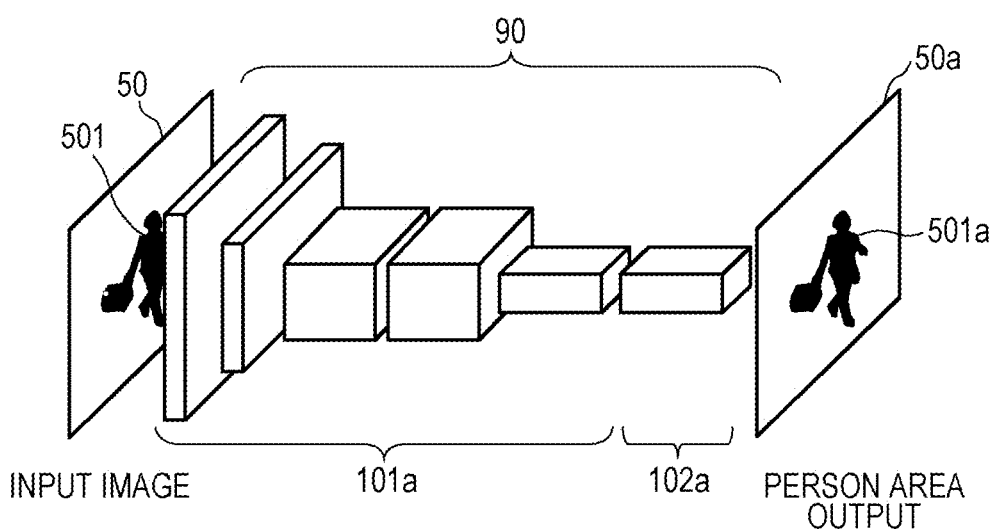
FIG. 10 is a diagram illustrating an outline of a structure of a second convolutional neural network used by the image recognizer shown in FIG. 9.
Figure 11A:
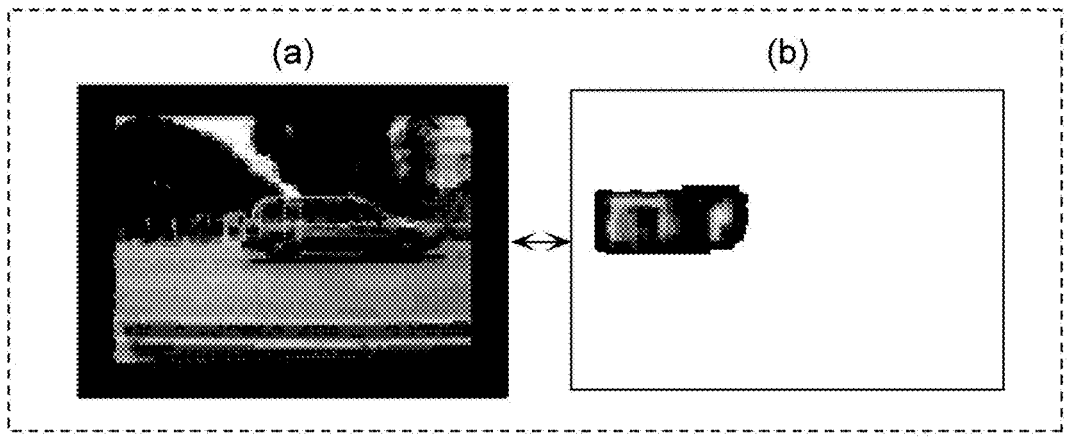
FIG. 11A is a diagram illustrating an example of a result of learning performed person area output neural network.
Figure 11B:
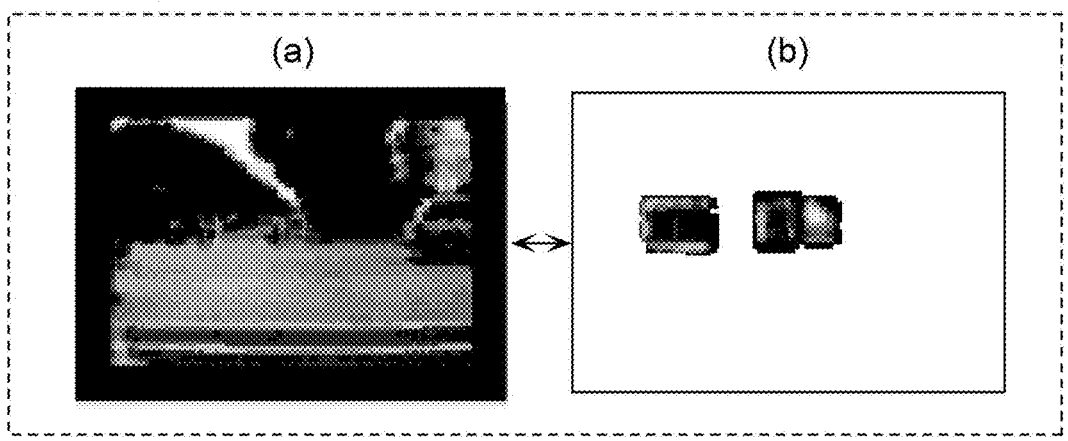
FIG. 11B is a diagram illustrating an example of a result of learning performed by a person area output neural network.
Figure 11C:
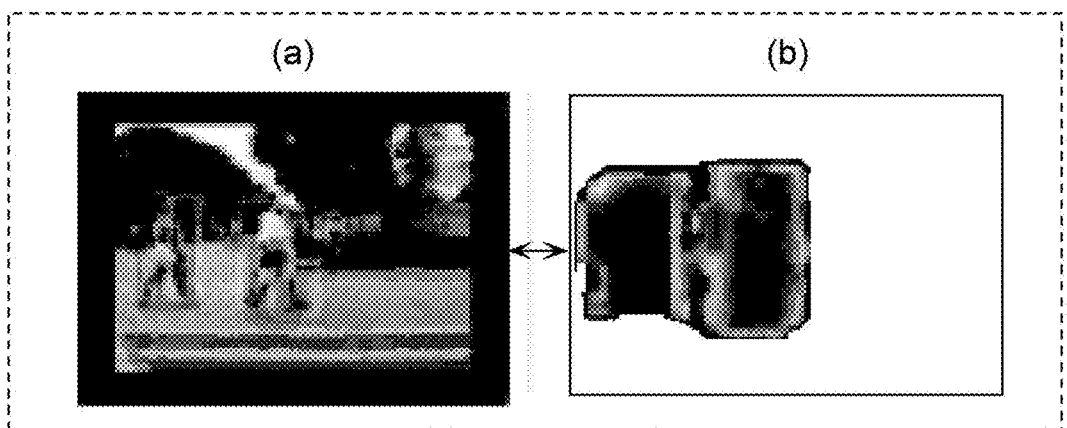
FIG. 11C is a diagram illustrating an example of a result of learning performed by a person area output neural network.

FIG. 10 is a diagram illustrating an outline of a structure of the second convolutional neural network used by the image recognizer 10a shown in FIG. 9. FIG. 11A to FIG. 11C are diagrams illustrating examples of results of learning performed by the person area output neural network. In each of FIG. 11A to FIG. 11C, (a) shows an example of a correct answer image, and (b) shows a result of a recognition process (learning result) on an input image. Note that the input image is the same as the correct answer image except that a frame in the correct answer image is removed.

As illustrated in FIG. 10, the second convolutional neural network used by the image recognizer 10a includes a convolutional layer 101a and a convolutional layer 102a. The second convolutional neural network used by the image recognizer 10a performs a recognition process on a person area in an input image 50 and outputs, as a recognition result, a feature map 501a indicating the person area in an image 50a, for example, in such a manner shown in FIG. 10. In other words, the weights (filter coefficients) of the convolutional layer 101a are learned in S11 and then further learned in S12. The weights (filter coefficients) of the convolutional layer 102a are learned in S12 such that the feature map 501a indicating the person area in the input image is output.

Note that the training process in S12 is disclosed in Jonathan Long, Evan Shelhamer, and Trevor Darrell, "Fully Convolutional Networks for Semantic Segmentation"; The IEEE Conference on Computer Vision and Pattern Recognition (CVPR), 2015, pp. 3431-3440, and thus a further detailed description thereof is not given here. As a result of performing the training process in S12, a result of the recognition process performed by the second convolutional neural network used by the image recognizer 10a, that is, the location of the feature map indicating the person area where the person (pedestrian) exists in the input image is the location of the frame indicated in the correct answer image, that is, the location of the person area as shown, for example, in FIGS. 11A to 11C.

Returning back to FIG. 9, a further description is given below.

Next, training of a person area coordinate output network is performed using the learning data described above (S13). More specifically, the computer of the image recognizer 10a makes the second convolutional neural network, which has performed the training process in S12, perform learning, using the learning data described above, as to outputting person area coordinates, that is, as to outputting coordinates of two points indicating a person area in an input image. That is, the second convolutional neural network of the image recognizer 10a, which has performed the training process in S12 in terms of outputting the feature map indicating the person area in the input image, is controlled to further perform a training process in S13 to output coordinates (person area coordinates) of two points indicating the person area in the input image.

Figure 12:
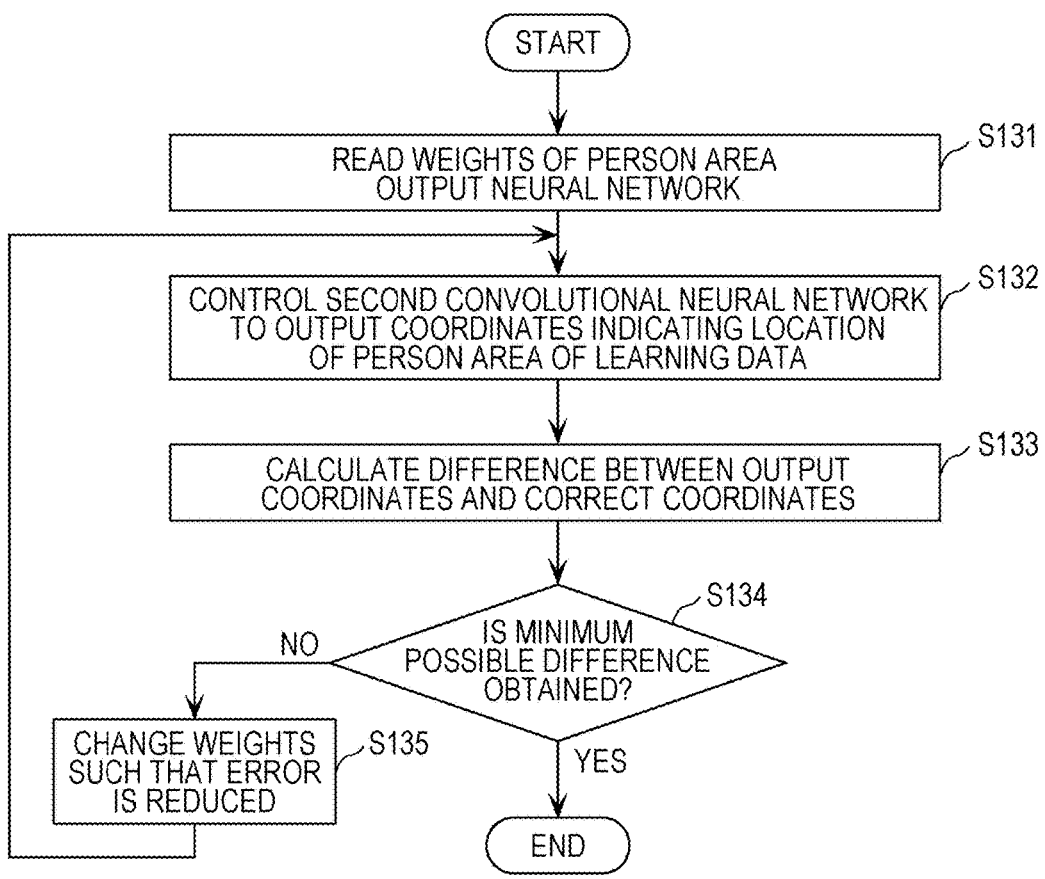
FIG. 12 is a flowchart showing details of a training process in S13.
Figure 13:
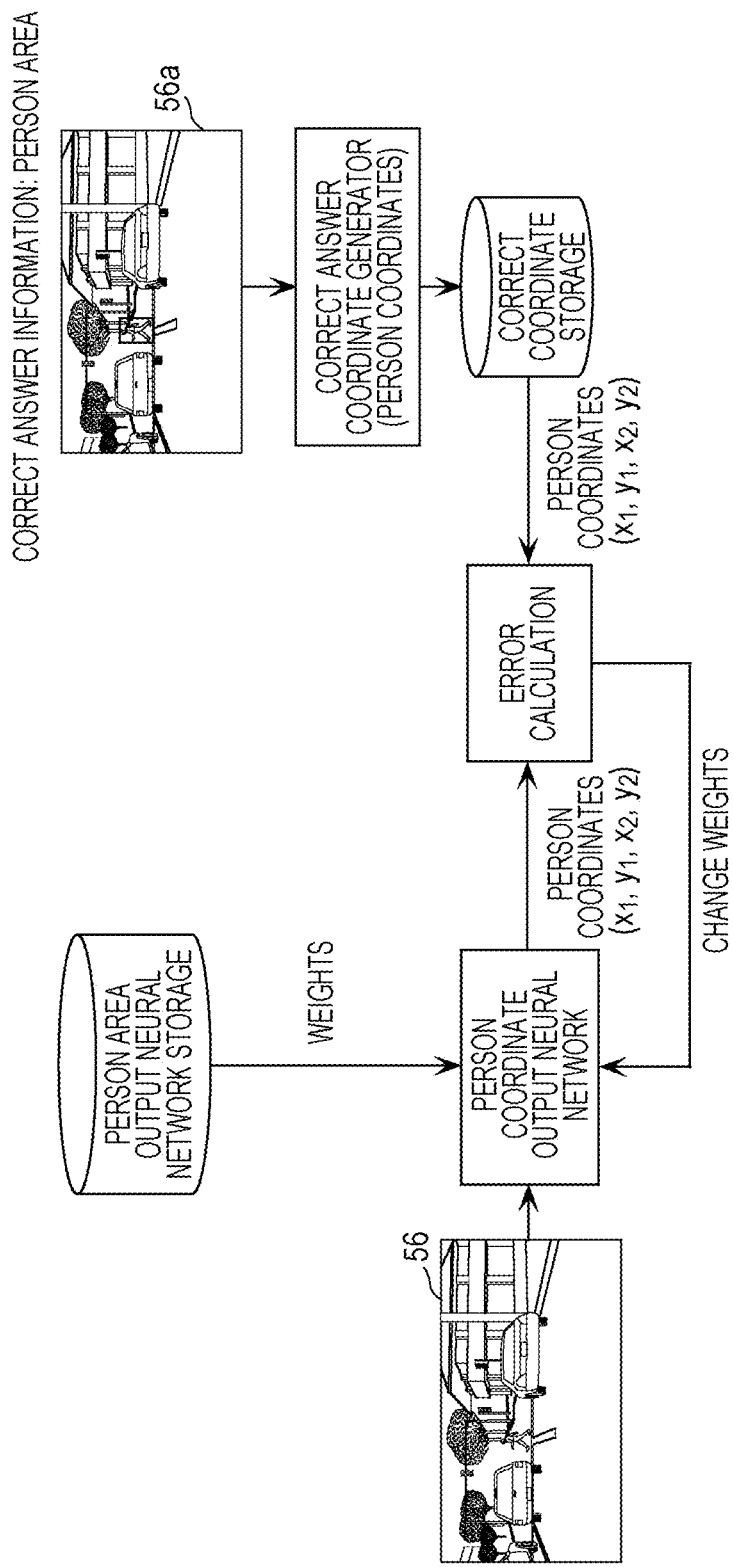
FIG. 13 is a diagram conceptually illustrating the training process shown in FIG. 12.

FIG. 12 is a flowchart showing details of the training process in S13, and FIG. 13 is a diagram conceptually illustrating the training process shown in FIG. 12.

In S13, first, the computer of the image recognizer 10a reads the weights of the person area output neural network as shown in FIG. 12 (S131). That is, the computer of the image recognizer 10a uses the weights, learned in S12, of the second convolutional neural network as initial values of the weights of the second convolutional neural network used by the image recognizer 10a. Referring to FIG. 13, the weights, learned in S12, of the second convolutional neural network are stored in a person area output neural network storage. The computer of the image recognizer 10a reads the weights stored in the person area output neural network storage and uses them as the initial values of the weights of the second convolutional neural network in the training process in S13.

The computer of the image recognizer 10a then makes the second convolutional neural network used by the image recognizer 10a output a value indicating a location of the person area using the learning data described above (S132). More specifically, the computer of the image recognizer 10a makes a second convolutional neural network output a value indicating a location of the recognition target in the training image included in the learning data wherein the second convolutional neural network has the same structure as that of the first convolutional neural network except that a fully connected layer in the convolutional neural network is replaced with a convolutional layer. Referring to FIG. 13, more specifically, the computer of the image recognizer 10a controls the second convolutional neural network to output, as the value indicating the location of the person area, for example, coordinates ((x1, y1), (x2, y2)) of two vertices on a diagonal of a rectangle surrounding a person in the input image 56 included in the learning data.

More specifically, the computer of the image recognizer 10a controls an output layer (recursion layer) of the second convolutional neural network to output coordinates (person area coordinates) of two points indicating a person area in the input image. More specifically, for example, the computer of the image recognizer 10a controls the recursion layer of the second convolutional neural network perform a process in S132 such that the weights stored in the person area output neural network storage are used as initial values of the weights for the second convolutional neural network in the process in S132, and the process in S132 is performed using, for example, a softmax function and a sigmoid function.

Next, the computer of the image recognizer 10a calculates the difference (error) between the coordinates output in S132 and correct answer coordinates (S133). More specifically, the calculation using the error function is performed to determine the error between the coordinates of two vertices on the diagonal of the rectangle surrounding the recognition target indicated by the correct answer image corresponding to the training image included in the learning data and the values indicating the location of the recognition target output in S132. As for the error function, an error function using a Euclidean distance is used.

Next, referring to FIG. 13, a correct answer image and correct answer coordinates are described below. In FIG. 13, a correct answer image 56a is an example of a correct answer image generated by adding an annotation of person and a frame (rectangle, box) indicating a person area to an input image included in a pedestrian data set. Person area coordinates in the correct answer image 56a are generated as correct answer coordinates and stored in a correct answer coordinate storage. In the present embodiment, the person area coordinates are coordinates of upper-left and lower-right vertices of four vertices of a rectangle surrounding a pedestrian (person) in an input image 56. The generation of the correct answer coordinates is performed before the training process for realizing the image recognizer 10 is performed. The computer of the image recognizer 10a then calculates the error of the person coordinates ((x1, y1), (x2, y2)) for the input image 56 output in S132 with respect to the correct answer coordinates ((x1, y1), (x2, y2)) for the input image 56 according to the error function using the Euclidean distance.

In a case where the difference between the coordinates output in S132 and the correct answer coordinates is not equal to a minimum value (No in S134), the computer of the image recognizer 10a changes the weights of the second convolutional neural network such that the difference is reduced (S135). The computer of the image recognizer 10a performs a recursive process in which the process is repeated from S132. As described above, the computer of the image recognizer 10a updates the weights for the second convolutional neural network based on the error calculated in S132. Then the second convolutional neural network with the weights changed in S135 is controlled to again perform the process in S132. The computer of the image recognizer 10a then performs the process in S133 to calculate the difference.

On the other hand, in a case where the difference between the coordinates output in S132 and the correct answer coordinates is equal to a minimum value, the process is ended. That is, if the error re-calculated in S133 reaches a minimum value, the recursive process is ended, and it is determined that the weights of the second convolutional neural network that result in the minimum error are employed as the weights for the first convolutional neural network.

As described above, the weights for the second convolutional neural network are learned such that coordinates (person area coordinates) of two points indicating a person area in an input image are output.

For convenience of illustration with FIG. 12 and FIG. 13, it is assumed in the above description that only one input image 56 is used in the training process. However, it may be advantageous to perform the training process for each predetermined number of input images, for example, each set of 10 to 20 input images. Furthermore, in the above description, it is assumed by way of example that when a minimum error is achieved when particular value of weights are employed for the second convolutional neural network, these weights are employed as the weights for the first convolutional neural network. However, alternatively, in a case where no change occurs in the values of the weights and no change occurs in the error when the recursive process is repeated, the weights in this situation may be employed as the weights for the first convolutional neural network. The minimum error may be defined such that the number of iterations of the recursive process is determined, and the minimum error is defined by a minimum error obtained during the iterations.

Result of Learning of Image Recognizer 10

Figure 14A:
FIG. 14A is a diagram illustrating an example of a result of learning performed by a person area coordinate output network.
Figure 14B:
FIG. 14B is a diagram illustrating an example of a result of learning performed by a person area coordinate output network.

FIG. 14A and FIG. 14B are diagrams illustrating examples of results of training of the person area coordinate output network. FIG. 14A shows a result of a recognition process (result of learning) on an input image (not shown). FIG. 14B shows an example of a correct answer image corresponding to the input image. Note that the input image does not have a frame (rectangle) indicated on the correct answer image as described above.

The location of the rectangle surrounding the person area in FIG. 14A corresponds to the location of the frame (rectangle) represented on the correct answer image in FIG. 14B. Therefore, in the training process in S13, a result of the recognition process performed by the second convolutional neural network used by the image recognizer 10a, that is, the person area coordinates in the input image are coordinates of the frame in the correct answer image, that is, the rectangle surrounding the person area, and thus they correspond to each other.

Second Embodiment

The image recognizer may be configured differently from that of the image recognizer 10 according to the first embodiment described above. In a second embodiment, an example of such a configuration is described. The following description of the image recognizer focuses on differences from the image recognizer 10 according to the first embodiment described above.

Configuration of Image Recognizer 20

Figure 15:
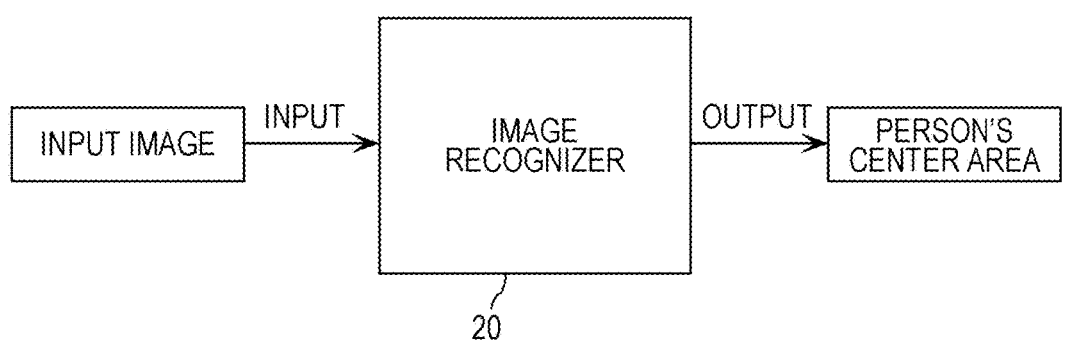
FIG. 15 is a diagram illustrating an example of a configuration of an image recognizer according to a second embodiment.
Figure 16:
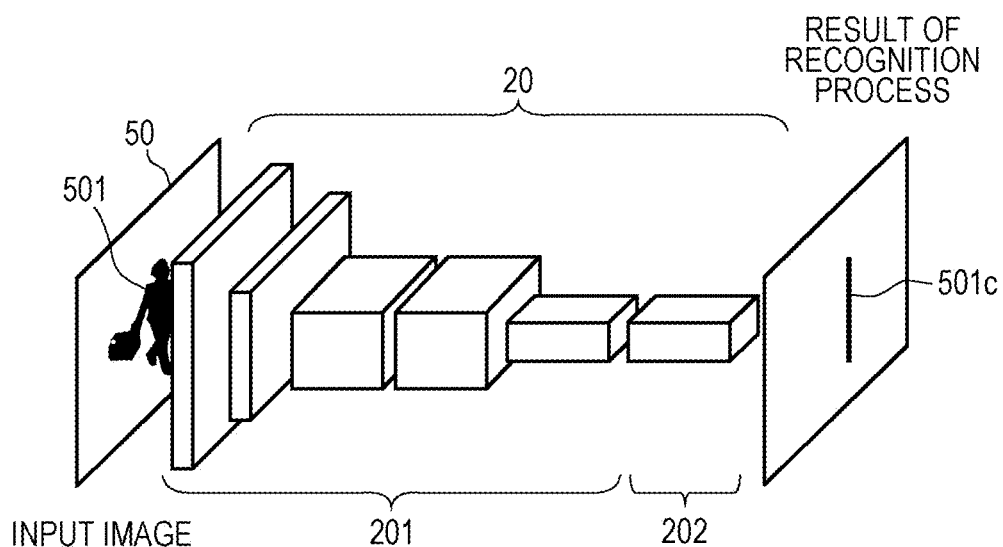
FIG. 16 is a diagram conceptually illustrating a result of a recognition process performed by the image recognizer according to the second embodiment.

FIG. 15 is a block diagram illustrating an example of a configuration of an image recognizer 20 according to the second embodiment. FIG. 16 is a diagram conceptually illustrating a result of a recognition process performed by the image recognizer 20 according to the second embodiment.

The image recognizer 20 shown in FIG. 15 may be realized by a computer or the like, as with the first embodiment. As shown in FIG. 16, the image recognizer 20 recognizes a person 501, which is a recognition target, in the image 50 by using a convolutional neural network including a convolutional layer 201 and a convolutional layer 202, and provides a value indicating the location, in the input image, of the recognized person 501 by outputting a center area 501c indicating the center of the person.

As described above, the image recognizer 20 shown in FIG. 15 is different from the image recognizer 10 according to the first embodiment in the manner of outputting a value indicating a location of a recognition target in an input image. A convolutional neural network in the image recognizer 20 is a first convolutional neural network including the convolutional layer 201 and a convolutional layer 202 wherein the fully connected layer is replaced by the convolutional layer 202. Although the first convolutional neural network in the image recognizer 20 has the same structure as that of the first convolutional neural network in the image recognizer 10 according to the first embodiment, they are different in terms of learned weights, and thus the outputting manner is different.

Operation of Recognition Process of Image Recognizer 20

Next, a recognition process performed by the image recognizer 20 according to the second embodiment is described below with reference to drawings.

Figure 17:
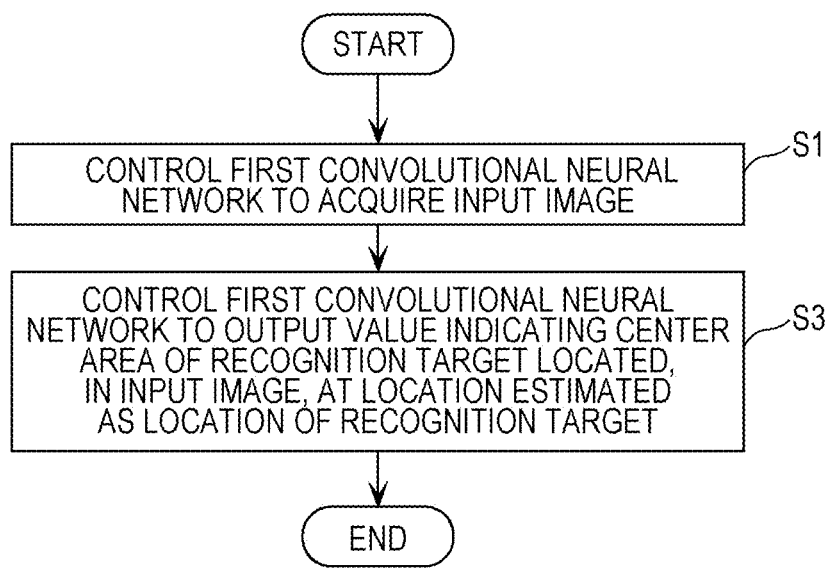
FIG. 17 is a flow chart illustrating an example of an operation of a recognition process according to the second embodiment.

FIG. 17 is a flow chart illustrating an example of a recognition process according to the present embodiment. In FIG. 17, similar elements to those in FIG. 6 are denoted by similar reference numerals.

As illustrated in FIG. 17, first, the computer of the image recognizer 20 makes the first convolutional neural network acquire an input image (S1). In the example shown in FIG. 16, an image 50 including one person 501 is input as an input image to the image recognizer 20. The first convolutional neural network used by the image recognizer 20 includes the convolutional layer 202 instead of the fully connected layer, which makes it possible to perform a recognition process on an input image s with an arbitrary size as with the image recognizer 10 according to the first embodiment.

Next, the first convolutional neural network is controlled to estimate a center area of the recognition target in the image 50 acquired in S1, and to output a value indicating the estimated center area as a location of the recognition target in the image 50 (S3). In the example shown in FIG. 16, the recognition process is performed on the person 501 such as a pedestrian in the image 50, and the value indicating the center area 501c of the person 501 is output. As for the center area 501c, the image recognizer 20 outputs, as a result of the recognition, a center area extending in the vertical direction, of center areas one of which extends in the vertical direction and the other one of which extends in the horizontal direction, in the input image of the recognition target. In the present embodiment, this center area 501c includes one to several pixels located in the middle of the recognition target, and it may be said to be a center line of the recognition target.

Effects and the Like of Image Recognizer 20

As described above, the image recognizer 20 according to the second embodiment is capable of outputting coordinates, in an image, of a recognition target, and thus is capable of correctly recognizing each of recognition targets that are partially overlapping. This is explained in further detail below with reference to drawings.

FIG. 18A is a diagram illustrating an example of a result of a recognition process performed by the image recognizer 20 according to the present embodiment. FIG. 18B is a diagram conceptually illustrating a feature of the recognition process performed by the image recognizer 20 according to the present embodiment.

As shown in FIG. 18A, in a case where the image recognizer 20 performs a recognition process on an image 53 including two pedestrians (a person 531 and a person 532), the image recognizer 20 outputs, as a recognition result, values indicating center areas (center areas 531a and 532a) of the two pedestrians so as to indicate locations of the two pedestrians in the image 53. More specifically, each of these center areas 531a and 532a is represented by a line including one to several pixels located in the middle of the corresponding recognition target, that is, the person 531 or the person 532.

Also in the present embodiment, it is assumed by way of example that the recognition target is a person. However, the recognition target is not limited to a person, but the recognition target may be a traffic sign or the like. Furthermore, in the present embodiment, it is assumed by way of example that the person is a pedestrian. However, the person is not limited to a pedestrian, but the person may be a running person, a creeping person, a swimming person, or the like.

As described above, the image recognizer 20 outputs, as a recognition result, a value indicating a center area of a recognition target in an input image. Therefore, as shown in FIG. 18B, the image recognizer 20 is capable of outputting, as a recognition result, values respectively indicating person center areas 54c and 54d in a case in which two persons in the input image partially overlap. Thus the image recognizer 20 is capable of correctly recognizing respective recognition targets partially overlap in the image and capable of outputting coordinates indicating a recognition result.

Training Process of Image Recognizer 20

A training process for realizing the image recognizer 20 is described below. In the following discussion, an image recognizer 20a denotes an image recognizer that is in a state where the training process for making it possible for the image recognizer to function as the image recognizer 20 is not yet performed.

To enable the image recognizer 20a to function as the image recognizer 20, the first convolutional neural network is controlled in advance to perform a training process to learn weights of the first convolutional neural network by using learning data including a plurality of sets of a training image and a correct answer image wherein the training image includes a recognition target and the correct answer image includes the training image and a value, added thereto, indicating a center area of the recognition target.

Figure 19:
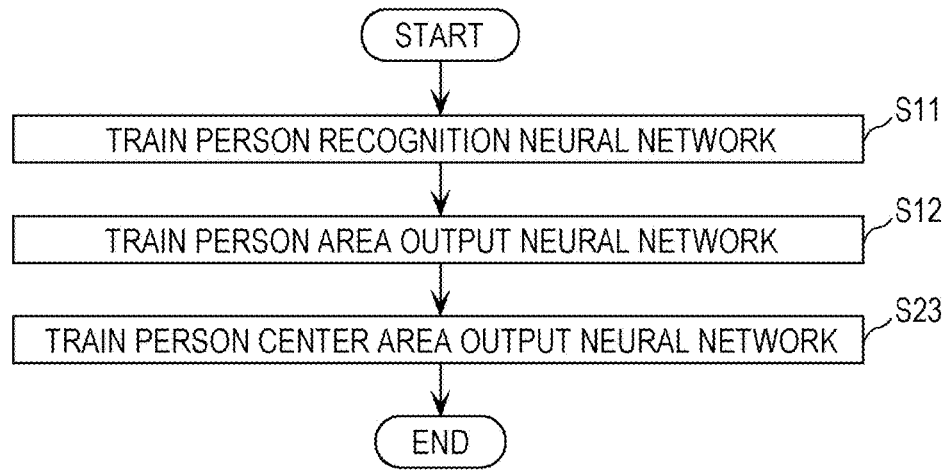
FIG. 19 is a flow chart illustrating an outline of a training process performed by the image recognizer according to the second embodiment.

FIG. 19 is a flow chart illustrating an outline of the training process performed by the image recognizer 20a according to the present embodiment. In FIG. 19, similar elements to those in FIG. 9 are denoted by similar reference numerals, and a further detailed description thereof is omitted.

First, as shown in FIG. 19, training of a person recognition neural network is performed using the learning data described above (S11), and then training of a person area output neural network is performed using the learning data described above (S12). S11 and S12 are performed in the manner described in the first embodiment, and thus a further description thereof is omitted.

Next, training of a person center area output neural network is performed using the learning data described above (S23). More specifically, the computer of the image recognizer 20a controls the second convolutional neural network, which has performed the training process in S12, to learn outputting a person center area, that is, to learn outputting a value indicating a center area of a person area in an input image. That is, the second convolutional neural network of the image recognizer 20a, which has performed the training process in S12 in terms of outputting the feature map indicating the person area in the input image, is controlled to further perform a training process in S23 to output a value indicating a center area (person center area) of a person area in an input image.

Figure 20:
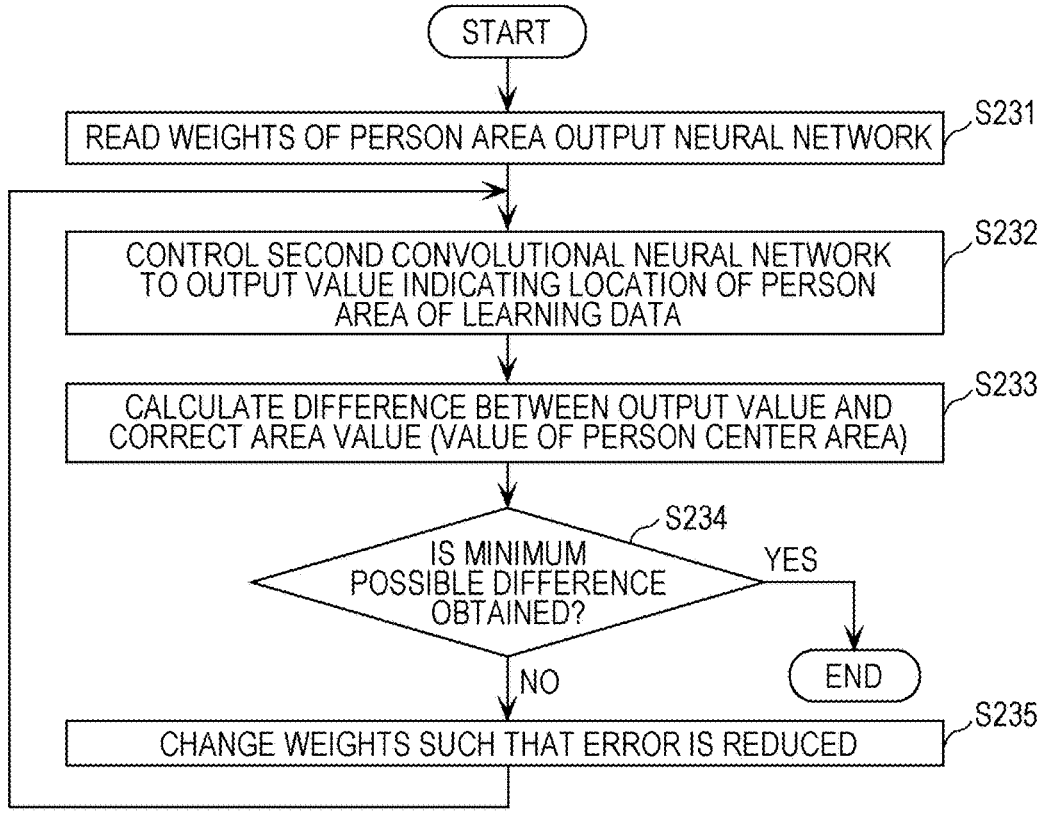
FIG. 20 is a flowchart showing details of a training process in S23.
Figure 21:
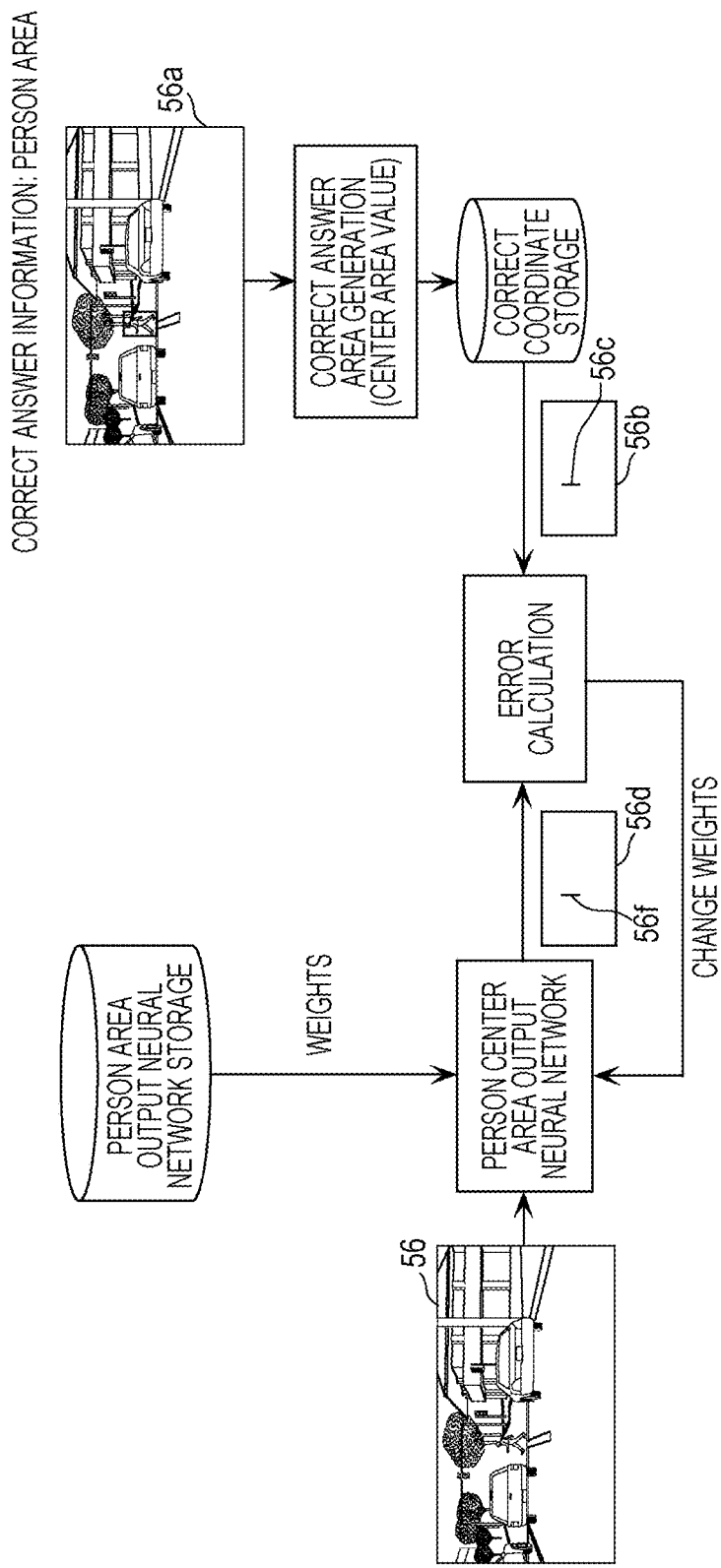
FIG. 21 is a diagram conceptually illustrating the training process shown in FIG. 20.
Figure 22:
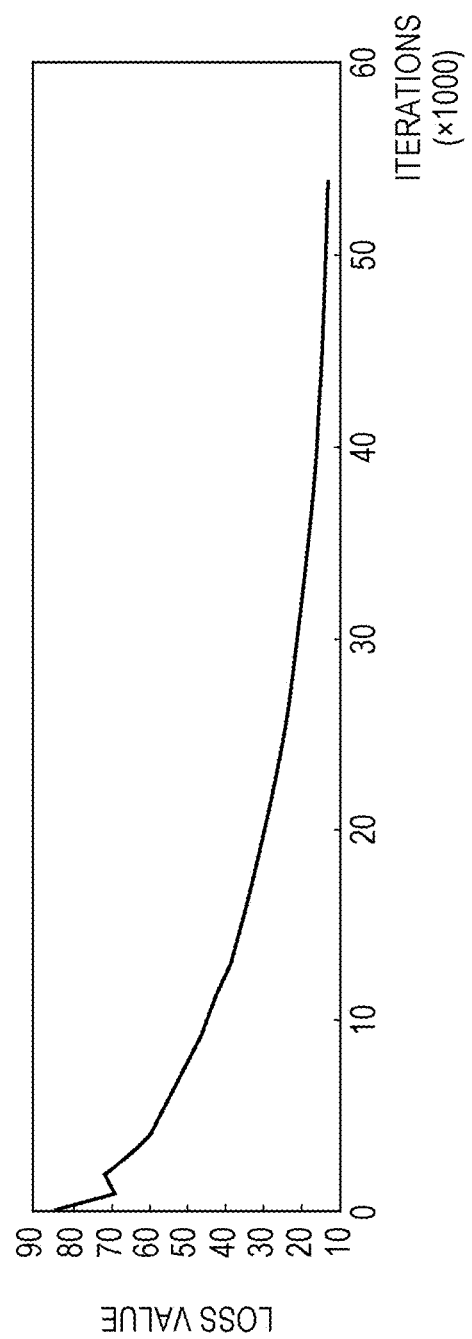
FIG. 22 is a diagram illustrating a manner in which an error decreases as the training process shown in FIG. 20 is performed recursively.

FIG. 20 is a flowchart showing details of the training process in S23. FIG. 21 is a diagram conceptually illustrating the training process shown in FIG. 20. FIG. 22 is a diagram illustrating a manner in which an error decreases as the training process shown in FIG. 20 is iterated.

First, in S23, the computer of the image recognizer 20a reads weights of the person area output neural network as shown in FIG. 20 (S231). That is, the computer of the image recognizer 20a uses the weights, learned in S12, of the second convolutional neural network as initial values of the weights of the second convolutional neural network used by the image recognizer 20a. Referring to FIG. 21, more specifically, the weights, learned in S12, of the second convolutional neural network are stored in the person area output neural network storage. The computer of the image recognizer 20a reads the weights stored in the person area output neural network storage and uses them as the initial values of the weights of the second convolutional neural network in the training process in S23.

The computer of the image recognizer 20a then controls the second convolutional neural network used by the image recognizer 20a to output a value indicating a center area of a person area using the learning data described above (S232). More specifically, the computer of the image recognizer 20a controls a second convolutional neural network to output a value indicating a location of the recognition target in the training image included in the learning data wherein the second convolutional neural network has the same structure as that of the first convolutional neural network except that a fully connected layer in the convolutional neural network is replaced with a convolutional layer. Referring to FIG. 21, more specifically, the computer of the image recognizer 20a controls the second convolutional neural network to output, as the value indicating the location of the person area, a value indicating the center area of the person in the input image 56 included in the learning data.

More specifically, the computer of the image recognizer 20a controls an output layer (recursion layer) of the second convolutional neural network to output the value indicating the center area of the person area in the input image. More specifically, for example, the computer of the image recognizer 20a controls the recursion layer of the second convolutional neural network to perform a process in S232 such that the weights stored in the person area output neural network storage are used as initial values of the weights for the second convolutional neural network in the process in S232, and the process in S232 is performed using a softmax function described in formula (1) and a sigmoid function described in formula (2).

$$\text{softmax: } pk = \frac{e^{x_k}}{[\sum_k, e^{x_{k'}}]} \ (k = [0, 1]) \tag{1}$$

$$\text{sigmoid: } Sp = \frac{1}{e^{-x}} \tag{2}$$

The computer of the image recognizer 20a then calculates the difference (error) between the value output in S232 and the correct answer area (S233). More specifically, the calculation using the error function is performed to determine the error between the value indicating the location of the recognition target output in S232 and the value indicating the center area (correct answer area) of the recognition target indicated by the correct answer image corresponding to the training image included in the learning data. As for the error function, an error function using cross entropy is used.

Next, referring to FIG. 21, the correct answer image and the correct answer area are described below.

In FIG. 21, a correct answer image 56a is an example of a correct answer image generated by adding an annotation of person and a frame indicating a person area to an input image included in a pedestrian data set, as with the first embodiment. A value indicating the center area of the person area in the correct answer image 56a is generated as a value indicating the correct answer area and is stored in a correct answer area storage. In the present embodiment, the person center area is represented by one to several pixels indicating a center area extending in the vertical direction in the input image 56. The generation of the correct answer area is performed before the training process for realizing the image recognizer 20 is performed. The computer of the image recognizer 20a calculates, using an error function using cross entropy, the error of the value indicating the center area 56f in, for example, the image 56d, that is, the error of the person center area output in S232 for the input image 56 with respect to the value indicating the center area 56b in, for example, the image 56c, that is, with respect to the correct answer area for the input image 56.

More specifically, the computer of the image recognizer 20a determines the distance between the distribution of the person center area output in S232 and the distribution of the correct answer area by using the error function using cross entropy according to formula (3).

$$E = -\frac{1}{n}\sum_{n=1}^{N}[Sp_n \log Sp'_n + (1 - Sp_n)\log(1 - Sp'_n)] \tag{3}$$

In a case where the difference between the value output in S232 and the value indicating the correct answer area is not equal to a minimum value (No in S234), the computer of the image recognizer 20a changes the weights of the second convolutional neural network such that the difference is reduced (S235). The computer of the image recognizer 20a performs a recursive process to repeat the process from S232. As described above, the computer of the image recognizer 20a changes the weights for the second convolutional neural network based on the error calculated in S232. The computer of the image recognizer 20a then controls the second convolutional neural network with the weights changed in S235 to again perform the process in S232, and then the computer of the image recognizer 20a performs the process in S233.

More specifically, the computer of the image recognizer 20a changes parameters indicating weights according to formula (4) where $hn_w$ denotes a negative weight.

$$w=w\times(1.0+hn_w) \quad (4)$$

On the other hand, in a case where the difference between the value output in S232 and the value indicating the correct answer area is equal to a minimum value, the process is ended. That is, if the error re-calculated in S233 reaches a minimum value, the recursive process is ended, and it is determined that the weights of the second convolutional neural network that result in the minimum error are employed as the weights for the first convolutional neural network.

As described above, the weights for the second convolutional neural network are learned such that the value indicating the center area of the person area in the input image is output.

For convenience of illustration with FIG. 20 and FIG. 21, it is assumed in the above description that only one input image 56 is used in the training process. However, it may be advantageous to perform the training process for each predetermined number of input images, for example, each set of 10 to 20 input images. Furthermore, in the above description, it is assumed by way of example that and it is determined that the weights of the second convolutional neural network that result in the minimum error are employed as the weights for the first convolutional neural network. However, alternatively, in a case where no change occurs in the values of the weights and no change occurs in the error when the recursive process is repeated, the weights in this situation may be employed as the weights for the first convolutional neural network. The minimum error may be defined such that the number of iterations of the recursive process is determined, and the minimum error is defined by a minimum error obtained during the iterations. For example, as shown in FIG. 22, the value of the error (loss value) given by the error function according to formula (3) decreases close to one tenth of its starting value as the recursive process is repeated. In the example shown in FIG. 22, the number of iterations of the recursive process may be set to 50×1000, and the weights of the second convolutional neural network used in the 50×1000th iteration may be employed as the weights for the first convolutional neural network.

Result of Learning of Image Recognizer 20

Figure 23A:
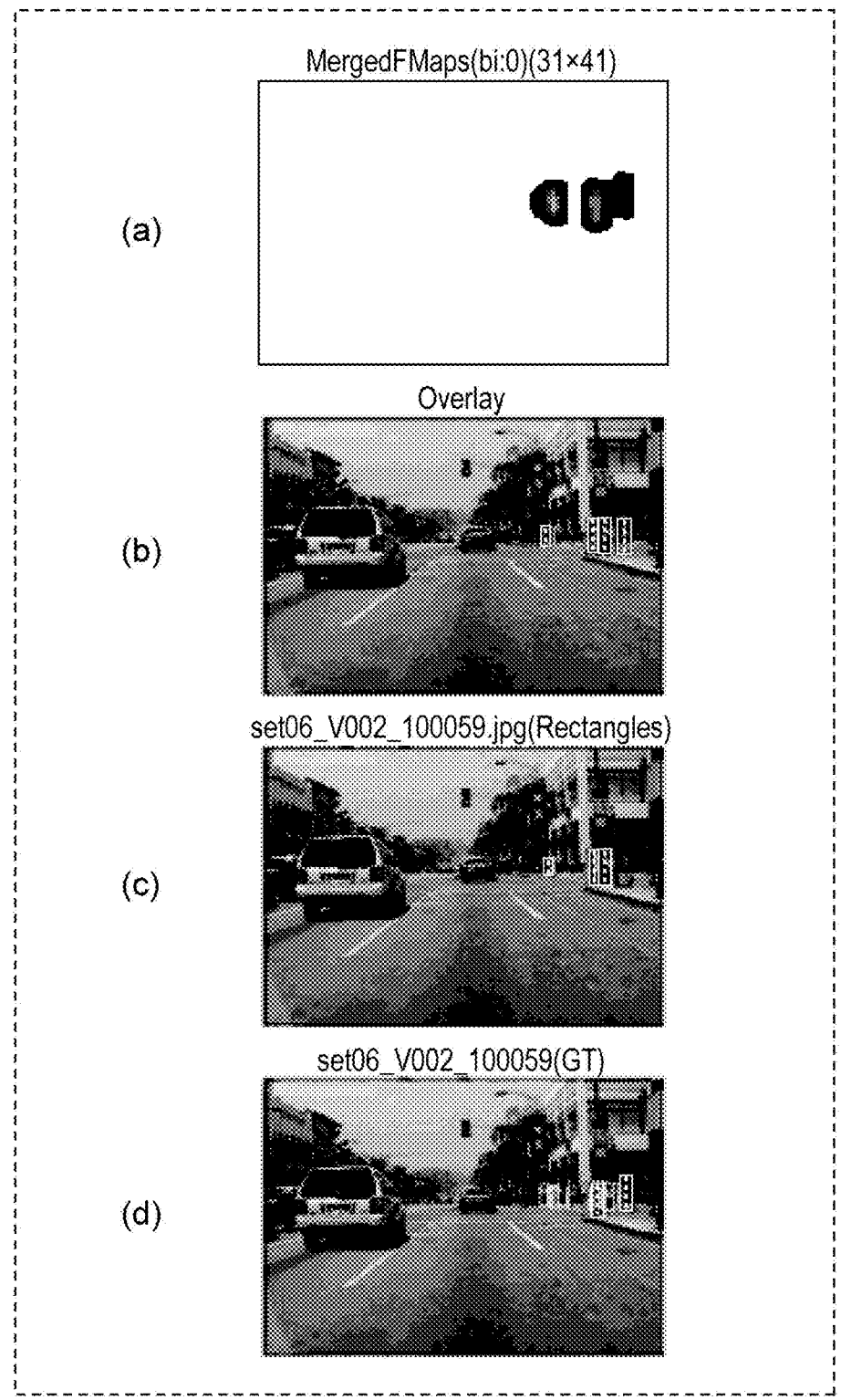
FIG. 23A is a diagram illustrating an example of a result of learning performed by a person center area output neural network.
Figure 23B:
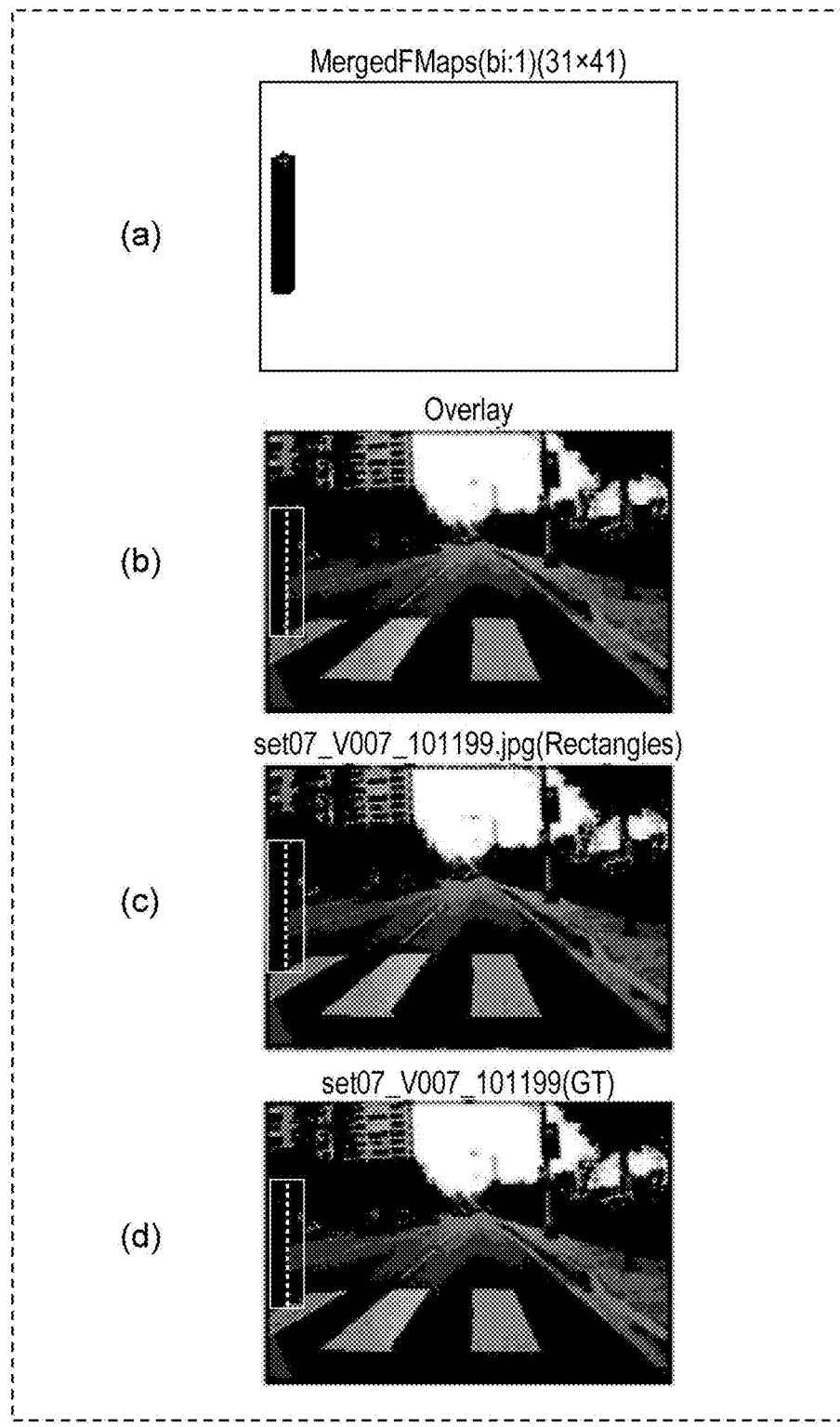
FIG. 23B is a diagram illustrating an example of a result of learning performed by a person center area output neural network.
Figure 23C:
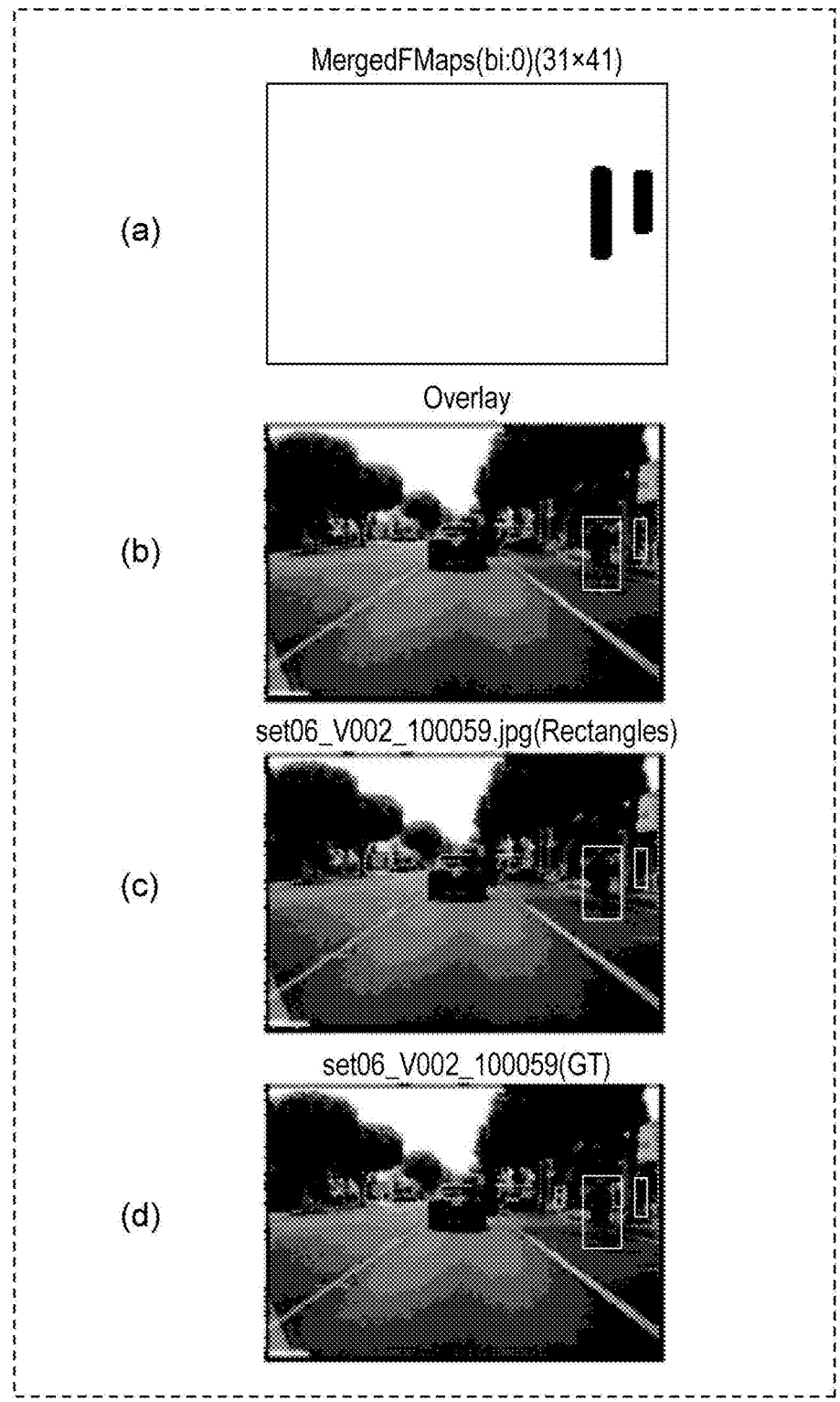
FIG. 23C is a diagram illustrating an example of a result of learning performed by a person center area output neural network.

FIG. 23A to FIG. 23C are diagrams illustrating examples of results of learning performed by a person center area output neural network. In each of FIG. 23A to FIG. 23C, (a) shows, as a result of learning performed by the person area output neural network, a feature map for an input image (not shown), (b) shows an intermediate result in the learning on the recursive process by the person center area output neural network, (c) shows, as a result of learning performed by the person center area output neural network, a result of the recognition process (result of learning) on the input image (not shown), and (d) shows a correct answer image added with a correct answer area. Note that the input image does not have a frame represented on the correct answer image as described above.

In each of FIG. 23A to FIG. 23C, the location of the center area indicating the person area in (c) corresponds to the location of the correct answer area in the correct answer image in (d). Thus, after the training process in S23 is performed, the result of the recognition process performed by the second convolutional neural network used by the image recognizer 20a, that is the person center area in the input image is the correct answer area added to the correct answer image, that is, they correspond to each other.

Third Embodiment

In a third embodiment, another example of an image recognizer configured differently from the first embodiment and the second embodiment is described referring to drawing. The following description focuses on differences from the image recognizer 10 according to the first embodiment or the second embodiment.

Configuration of Image Recognizer 30 and Result of Recognition Process

FIG. 24 is a diagram illustrating an outline of a structure of a convolutional neural network used by an image recognizer 30 according to the present embodiment and also illustrating a result of a structure process. In FIG. 24, similar elements to those in FIG. 7 or FIG. 16 are denoted by similar reference numerals, and a further detailed description thereof is omitted.

The image recognizer 30 shown in FIG. 24 may be realized by a computer or the like as in the first and second embodiments. As shown in FIG. 24, the image recognizer 30 recognizes a person given as a recognition target in an input image by using a convolutional neural network including a convolutional layer 101A, a convolutional layer 102, and a convolutional layer 202. The image recognizer 30 outputs a value indicating a location, in the input image, of the recognized person by providing a center area (person center area) indicating a center of the person, and also outputs the value indicating, in coordinates (person coordinates), the location, in the input image, of the recognized person.

That is, the image recognizer 30 shown in FIG. 24 is different in the manner of outputting the value indicating the location of the recognition target in the input image from the image recognizer 10 according to the first embodiment and the image recognizer 20 according to the second embodiment. However, the person center area and the person coordinates, which are output in parallel, are similar to those according to the first and second embodiments, and thus a further description thereof is omitted here.

As described above, the convolutional neural network used by the image recognizer 30 is modified such that the fully connected layer is replaced with the convolutional layer 102 and the convolutional layer 202, and the output of the convolutional layer 101A is connected to the convolutional layer 102 and the convolutional layer 202. The convolutional layer 101A is similar in structure to the convolutional layer 101 according to the first embodiment. However, learned weights are different. Thus, the image recognizer 30 is capable of outputting the person center area and the person coordinate in parallel.

Training Process of Image Recognizer 30

A training process for realizing the image recognizer 30 is described below. Learning data used to train the convolutional neural network used by the image recognizer 30 includes sets of an image of a person and a corresponding correct answer image added with an annotation on the person.

Figure 25:
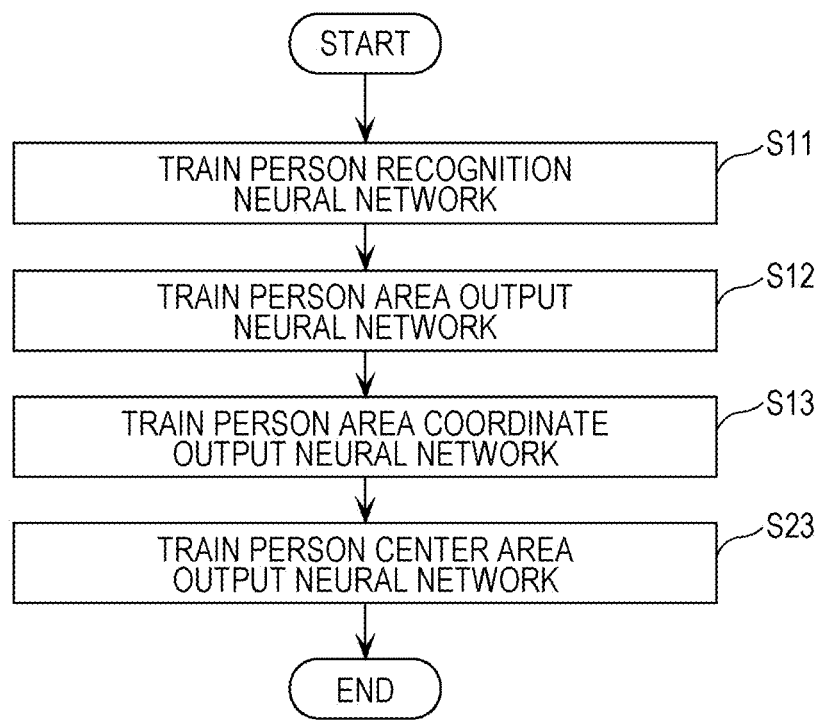
FIG. 25 is a flow chart illustrating an outline of a training process performed by the image recognizer according to the third embodiment.

FIG. 25 is a flow chart illustrating an outline of a training process performed by the image recognizer 30 according to the third embodiment. In FIG. 25, similar elements to those in FIG. 9 or FIG. 19 are denoted by similar reference numerals, and a further detailed description thereof is omitted.

As shown in FIG. 25, first, training of a person recognition neural network is performed using the learning data described above (S11), and training of the person area output neural network is performed using the learning data described above (S12). S11 and S12 are performed as described in the previous embodiment, and thus a further description is omitted.

Training of a person area coordinate output network is performed using the learning data (S13). Subsequently, training of a person center area output neural network is performed (S23). Note that the order of performing the training of the person area coordinate output network and the training of the person center area output neural network may be reversed.

In the present embodiment, the training of the person area coordinate output network corresponds to learning of weights for the convolutional layer 101A and the convolutional layer 102, in which correct answer coordinates generated from the correct answer image of the learning data are used as teaching data as in the first embodiment. As for the error function, an error function using a Euclidean distance is used. On the other hand, the training of the person center area output neural network corresponds to learning of weights for the convolutional layer 101A and the convolutional layer 202 in which a correct answer area generated from the correct answer image of the learning data is used as teaching data as in the second embodiment. As for the error function, an error function using cross entropy is used. Other features are similar to those according to the first or second embodiment, and thus a further description thereof is omitted.

OTHER EMBODIMENTS

In the image recognition method described above with reference to the first to third embodiments, there is no particular restriction on elements, units, or apparatuses that perform processes. The processing may be performed using a processor (such as that described below) or the like built-in a particular apparatus disposed locally, or may be performed by a cloud server or the like installed at a location different from the location of the local apparatus.

Figure 26:
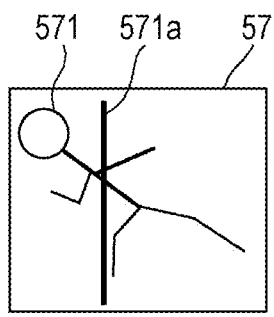
FIG. 26 is a diagram illustrating a person center area for a case where a recognition target is a running person.

FIG. 26 is a diagram illustrating a person center area for a case where the recognition target is a running person.

That is, in a case where the recognition target is a running person 571, the person center area may be a person center area 571a represented by one to several pixels indicating a center area extending in the vertical direction in the input image 57. Although this is not the exact center of the person, the person center area 571a given in the above-described manner indicates the center of the area including the person, and this makes it easy generate the correct answer area and perform the training process.

Note that the present disclosure is not limited to the embodiments described above. For example, constituent elements described above may be arbitrarily combined or one or more constituent elements described above may be removed, and a result may be employed as another embodiment according to the present disclosure. Furthermore, it will be understood by those skilled in the art that various modifications are possible to the embodiments described above without departing from the spirit and the scope according to the present disclosure, that is, without departing from the scope defined in claims.

The present disclosure also includes in its scope the following.

(1) A specific example of the apparatus described above is a computer system including a microprocessor, a ROM, a RAM, a hard disk unit, a display unit, a keyboard, a mouse, and the like. A computer program is stored in the RAM or the hard disk unit. In each apparatus, the microprocessor operates according to the computer program thereby achieving the function of the apparatus. The computer program is a combination of a plurality of instruction codes indicating instructions that are given to the computer to achieve a particular function.

(2) Part or all of the constituent elements of the apparatus described above may be implemented in a single system LSI (Large Scale Integration). The system LSI is a super-multifunction LSI produced such that a plurality of parts are integrated on a single chip. More specifically, the system LSI is a computer system including a microprocessor, a ROM, a RAM, and so on. A computer program is stored in the RAM. In the system LSI, the microprocessor operates according to the computer program thereby achieving the function of the system LSI.

(3) Part or all of the constituent elements of the apparatus described above may be implemented in the form of an IC card attachable to the apparatus or in the form of a single module. The IC card or the module is a computer system including a microprocessor, a ROM, a RAM, and the like. The IC card or the module may include the super-multifunction LSI described above. In the IC card or the module, the microprocessor operates according to the computer program thereby achieving the function of the IC card or the module. The IC card or the module may be configured so as to be resistant against tampering.

(4) The present disclosure may be implemented as a method. The method may be realized by a computer program that is to be executed by a computer or the method may be realized by a digital signal associated with the computer program.

(5) The present disclosure may be implemented by a computer readable storage medium, such as a flexible disk, a hard disk, a CD-ROM, an MO disk, a DVD disk, a DVD-ROM disk, a DVD-RAM disk, a BD (Blu-ray Disc), a semiconductor memory, or the like in which the computer program or the digital signal are stored. The digital signal may be recorded in the storage medium described above.

The present disclosure may be implemented by transmitting the computer program or the digital signal via a telecommunication line, a wired or wireless communication line, a network typified by the Internet, data broadcasting, or the like.

The present disclosure may be implemented by a computer system including a microprocessor and a memory, wherein the computer program is stored in the memory and the microprocessor operates according to the computer program.

The program or the digital signal may be stored in the storage medium and the storage medium may be transported, or the program or the digital signal may be transferred via the network or the like thereby allowing the present disclosure to be implemented in another computer system.

The present disclosure may be applied to an image recognition method capable of correctly recognizing each of recognition targets even when the recognition targets partially overlap. In particular, the present disclosure may be applied to an image recognition method for effectively recognizing a recognition target in an image captured by a surveillance camera, an in-vehicle camera, a store camera, or the like.

What is claimed is:

1. An image recognition method executed by a computer of an image recognizer using a convolutional neural network, the convolutional neural network being a first convolutional neural network in which a fully connected layer is changed to a convolutional layer, the method comprising:

controlling the first convolutional neural network to acquire an input image including a recognition target; and controlling the first convolutional neural network to perform a recognition process on the input image and as a result of the recognition process to output only coordinates of two vertices on a diagonal of a rectangle surrounding the recognition target in the acquired input image, the first convolutional neural network outputting the coordinates as a result of estimating the coordinates of two vertices on the diagonal of the rectangle surrounding the recognition target in the acquired input image, the outputted coordinates being the estimated coordinates of the two vertices on the diagonal of the rectangle as a location of the recognition target in the input image.

2. The image recognition method according to claim 1, further comprising:

before performing the acquisition of the input image by the first convolutional neural network, controlling the first convolutional neural network to learn a weight of the first convolutional neural network by using learning data including a plurality of sets of a training image and a correct answer image, the training image including a recognition target, the correct answer image including the training image and coordinates of two vertices on a diagonal of a rectangle surrounding the recognition target in the training image and a value indicating a location of a center line indicating a center of the recognition target in the training image.

3. The image recognition method according to claim 2, wherein the learning includes:

controlling a second convolutional neural network to output a value indicating a location of the recognition target in the training image included in the learning data, the second convolutional neural network having the same structure as that of the first convolutional neural network, calculating an error, according to an error function, between the output value indicating the location of the recognition target and coordinates of two vertices on a diagonal of a rectangle surrounding the recognition target indicated by the correct answer image corresponding to the training image included in the learning data, updating a weight of the second convolutional neural network based on the calculated error, recursively performing the calculation by controlling the second convolutional neural network with the updated weight of the second convolutional neural network to again perform the outputting in the learning, and in a case where the calculated error achieves a minimum value in the recursive calculation, ending the recursive calculation and determining the weight of the second convolutional neural network assigned when the error achieves the minimum value as the weight of the first convolutional neural network.

4. The image recognition method according to claim 3, wherein the error function is an error function using a Euclidean distance.

5. The image recognition method according to claim 1, wherein the recognition target is a person in the input image.

* * * * *